US012121187B2

(12) United States Patent
Osborne, Jr.

(10) Patent No.: US 12,121,187 B2
(45) Date of Patent: *Oct. 22, 2024

(54) DISPENSER FOR ROLLED SHEET MATERIALS

(71) Applicant: Charles Agnew Osborne, Jr., Cumming, GA (US)

(72) Inventor: Charles Agnew Osborne, Jr., Cumming, GA (US)

( * ) Notice: Subject to any disclaimer, the term of this patent is extended or adjusted under 35 U.S.C. 154(b) by 322 days.

This patent is subject to a terminal disclaimer.

(21) Appl. No.: 17/464,870

(22) Filed: Sep. 2, 2021

(65) Prior Publication Data

US 2021/0393089 A1 Dec. 23, 2021

Related U.S. Application Data

(63) Continuation of application No. 15/988,579, filed on May 24, 2018, now Pat. No. 11,109,722.

(51) Int. Cl.
*A47K 10/36* (2006.01)
*A47K 10/38* (2006.01)
(Continued)

(52) U.S. Cl.
CPC ...... *A47K 10/3612* (2013.01); *A47K 10/3618* (2013.01); *A47K 10/3625* (2013.01);
(Continued)

(58) Field of Classification Search
CPC .... A47K 10/34; A47K 10/36; A47K 10/3606; A47K 10/3612; A47K 10/3618;
(Continued)

(56) References Cited

U.S. PATENT DOCUMENTS

| 1,553,331 A * | 9/1925 | Shelley .............. A47K 10/3643 83/334 |
| 2,738,934 A | 3/1956 | Dobkin |

(Continued)

FOREIGN PATENT DOCUMENTS

| CN | 104703521 A | 6/2015 |
| EP | 0378550 B1 | 9/1994 |
| WO | WO2018/126236 A1 | 7/2018 |

OTHER PUBLICATIONS

Extended European Search Report of European Application No. 19808062.4 dated Jan. 28, 2022.
(Continued)

*Primary Examiner* — Evan H MacFarlane
(74) *Attorney, Agent, or Firm* — Womble Bond Dickinson (US) LLP

(57) ABSTRACT

A dispenser having a feed roller that at least partially engages sheet material to facilitate dispensing thereof, and a cutting mechanism disposed within a chamber defined by a body of the feed roller. The cutting mechanism including a cutting blade and at least one movable support connected thereto. The at least one support further is operatively connected to the body of the feed roller and is actuated with rotation thereof to move the cutting blade into and out from one or more openings defined along the body of the feed roller to at least partially cut or perforate a selected portion of the sheet material as the sheet material is dispensed.

18 Claims, 27 Drawing Sheets

(51) Int. Cl.
  *B65H 16/10* (2006.01)
  *B65H 35/00* (2006.01)
  *F16H 1/28* (2006.01)
(52) U.S. Cl.
  CPC ....... *A47K 10/3637* (2013.01); *B65H 16/106* (2013.01); *B65H 35/006* (2013.01); *A47K 2010/365* (2013.01); *A47K 2010/3668* (2013.01); *A47K 2010/3863* (2013.01); *B65H 2301/41306* (2013.01); *B65H 2301/41346* (2013.01); *B65H 2601/521* (2013.01); *B65H 2701/1924* (2013.01); *F16H 1/28* (2013.01); *Y10T 83/896* (2015.04)
(58) Field of Classification Search
  CPC ............ A47K 10/3625; A47K 10/3631; A47K 10/3637; A47K 10/3643; A47K 2010/365; A47K 2010/3863; B65H 2701/1924
  See application file for complete search history.

(56) References Cited

U.S. PATENT DOCUMENTS

| | | | |
|---|---|---|---|
| 3,317,150 A | 5/1967 | Summersby |
| 3,554,456 A | 1/1971 | Moore |
| 3,892,368 A | 7/1975 | Ricards |
| 3,893,636 A | 7/1975 | Wise et al. |
| 4,003,525 A | 1/1977 | Podvin et al. |
| 4,071,200 A | 1/1978 | Stone |
| 4,192,442 A | 3/1980 | Bastian et al. |
| 4,635,837 A | 1/1987 | Granger |
| 4,690,344 A | 9/1987 | Yokota |
| 4,712,461 A | 12/1987 | Rasmussen |
| 4,738,176 A | 4/1988 | Cassia |
| 4,790,490 A | 12/1988 | Chakravorty |
| 4,846,035 A | 7/1989 | Granger |
| 5,048,386 A | 9/1991 | DeLuca et al. |
| 5,060,877 A | 10/1991 | Bullivant |
| 5,441,210 A | 8/1995 | Hinton |
| 5,452,832 A | 9/1995 | Niada |
| 5,672,206 A | 9/1997 | Gorman |
| 5,772,291 A | 6/1998 | Bryd et al. |
| 5,848,609 A | 12/1998 | Marchesseault et al. |
| 6,079,305 A | 6/2000 | Bloch et al. |
| 6,098,917 A | 8/2000 | Cruz |
| 6,179,243 B1 | 1/2001 | Granger |
| 6,196,102 B1 | 3/2001 | Granger |
| 6,199,792 B1 | 3/2001 | Mivelaz |
| 6,283,139 B1 | 9/2001 | Symonds |
| 6,314,850 B1 | 11/2001 | Morand |
| 6,378,725 B1 | 4/2002 | Granger |
| 6,408,727 B1 | 6/2002 | Harris et al. |
| 6,411,920 B1 | 6/2002 | McConnell |
| 6,532,979 B1 | 3/2003 | Richter |
| 6,553,879 B2 | 4/2003 | Morand |
| 6,691,945 B2 | 2/2004 | Slezak |
| 6,695,246 B1 | 2/2004 | Elliott et al. |
| 6,715,730 B2 | 4/2004 | Ehr |
| 6,820,785 B2 | 11/2004 | Kapiloff |
| 6,826,985 B2 | 12/2004 | Broehl |
| 6,834,825 B2 | 12/2004 | Pollastrelli et al. |
| 6,892,620 B2 | 5/2005 | Kapiloff |
| 6,892,746 B2 | 5/2005 | Ford |
| 6,895,848 B1 | 5/2005 | Svensson |
| 6,903,654 B2 | 6/2005 | Hansen et al. |
| 6,977,588 B2 | 12/2005 | Schotz et al. |
| 6,988,689 B2 | 1/2006 | Thomas et al. |
| 7,147,204 B2 | 12/2006 | Hollingsworth |
| 7,213,782 B2 | 5/2007 | Osborne et al. |
| 7,296,765 B2 | 11/2007 | Rodrian |
| 7,357,348 B2 | 4/2008 | Kananen |
| 7,370,824 B1 | 5/2008 | Osborne |
| 7,373,864 B2 | 5/2008 | Granger |
| 7,460,013 B1 | 12/2008 | Osborne et al. |
| 7,527,215 B1 | 5/2009 | Siddiqui |
| 7,571,670 B2 | 8/2009 | Formon |
| 7,637,452 B2 | 12/2009 | Kanbar et al. |
| 7,946,522 B2 | 5/2011 | Lewis et al. |
| 7,987,756 B2 | 8/2011 | Lewis et al. |
| 8,082,827 B2 | 12/2011 | Friesen et al. |
| 8,146,471 B2 | 4/2012 | Hansen et al. |
| 8,167,228 B2 | 5/2012 | Kobayashi et al. |
| 8,297,160 B2 | 10/2012 | Friesen et al. |
| 8,353,475 B2 | 1/2013 | Kobayashi et al. |
| 8,382,026 B2 | 2/2013 | Keily et al. |
| 8,402,872 B2 | 3/2013 | Friesen et al. |
| 8,424,431 B1 | 4/2013 | Jackman et al. |
| 8,468,920 B2 | 6/2013 | Hagleitner |
| 8,528,851 B2 | 9/2013 | Friesen et al. |
| 8,555,761 B2 | 10/2013 | Keily et al. |
| 8,578,826 B2 | 11/2013 | Hansen et al. |
| 8,651,003 B1 | 2/2014 | Vercellone |
| 8,733,218 B2 | 5/2014 | Hansen et al. |
| 8,800,415 B2 | 8/2014 | Osborne |
| 8,919,233 B2 | 12/2014 | Lewis et al. |
| 8,943,938 B2 | 2/2015 | Sahlberg |
| 9,010,602 B2 | 4/2015 | Budz et al. |
| 9,032,850 B2 | 5/2015 | Chiba et al. |
| 9,701,508 B2 | 7/2017 | Diamond |
| 9,756,992 B2 | 9/2017 | Osborne |
| 9,907,441 B2 | 3/2018 | Osborne et al. |
| 10,441,117 B2 | 10/2019 | Osborne, Jr. |
| 10,660,486 B2 | 5/2020 | Osborne, Jr. |
| 10,835,086 B2 | 11/2020 | Osborne, Jr. |
| 11,071,415 B2 | 7/2021 | Osborne, Jr. |
| 11,109,722 B2 | 9/2021 | Osborne, Jr. |
| 11,142,419 B2 | 10/2021 | Osborne, Jr. |
| 11,154,166 B2 | 10/2021 | Osborne, Jr. |
| 2001/0045149 A1 | 11/2001 | Granger |
| 2002/0073819 A1 | 6/2002 | Phelps et al. |
| 2002/0096028 A1* | 7/2002 | Morand ............. A47K 10/3687 83/13 |
| 2003/0019899 A1 | 1/2003 | Chen |
| 2004/0188486 A1 | 9/2004 | Granger |
| 2005/0051008 A1 | 3/2005 | Granger |
| 2005/0145745 A1 | 7/2005 | Lewis et al. |
| 2005/0167541 A1 | 8/2005 | Osborne |
| 2006/0037449 A1 | 2/2006 | Lavallee |
| 2006/0236832 A1 | 10/2006 | Cvjetkovic et al. |
| 2007/0079684 A1 | 4/2007 | Friesen et al. |
| 2007/0176041 A1 | 8/2007 | Friesen et al. |
| 2007/0194166 A1 | 8/2007 | Reinsel et al. |
| 2007/0215743 A1 | 9/2007 | Granger |
| 2008/0128448 A1 | 6/2008 | Cittadino |
| 2008/0217350 A1 | 9/2008 | Hansen et al. |
| 2009/0057478 A1 | 3/2009 | Connor |
| 2009/0140001 A1 | 6/2009 | Lewis et al. |
| 2009/0256022 A1 | 10/2009 | Maurer |
| 2010/0102101 A1 | 4/2010 | Keily et al. |
| 2010/0243696 A1 | 9/2010 | Friesen et al. |
| 2010/0286817 A1 | 11/2010 | Goeking |
| 2010/0319508 A1 | 12/2010 | Hagleitner |
| 2011/0068129 A1 | 3/2011 | Maurer |
| 2011/0133019 A1 | 6/2011 | Keily et al. |
| 2011/0233318 A1 | 9/2011 | Anderson |
| 2012/0085857 A1 | 4/2012 | Vienneau et al. |
| 2012/0167739 A1 | 7/2012 | Lewis et al. |
| 2012/0182366 A1 | 7/2012 | Kobayashi et al. |
| 2012/0312853 A1 | 12/2012 | Osborne et al. |
| 2013/0192437 A1 | 8/2013 | Sahlberg |
| 2013/0320130 A1 | 12/2013 | Osborne |
| 2014/0054410 A1 | 2/2014 | Achton |
| 2014/0263812 A1 | 9/2014 | Osborne |
| 2014/0312158 A1 | 10/2014 | Hluschenko et al. |
| 2015/0083846 A1 | 3/2015 | Budz et al. |
| 2015/0297043 A1 | 10/2015 | Osborne et al. |
| 2016/0353945 A1 | 12/2016 | Osborne |
| 2016/0353946 A1 | 12/2016 | Osborne |
| 2016/0353947 A1 | 12/2016 | Osborne |
| 2017/0188760 A1 | 7/2017 | Henson et al. |
| 2017/0367547 A1 | 12/2017 | Osborne |
| 2017/0369262 A1 | 12/2017 | Green |
| 2018/0146829 A1 | 5/2018 | Osborne |
| 2018/0153360 A1 | 6/2018 | Osborne, Jr. et al. |

(56) References Cited

U.S. PATENT DOCUMENTS

| | | |
|---|---|---|
| 2018/0170703 A1 | 6/2018 | Osborne, Jr. |
| 2018/0263433 A1 | 9/2018 | Osborne, Jr. |
| 2019/0174972 A1 | 6/2019 | Osborne, Jr |
| 2020/0029751 A1 | 1/2020 | Osborne, Jr. |
| 2020/0054177 A1 | 2/2020 | Osborne, Jr. |
| 2020/0163498 A1 | 5/2020 | Osborne, Jr. |
| 2020/0187727 A1 | 6/2020 | Osborne, Jr |
| 2020/0205620 A1 | 7/2020 | Osborne, Jr. |
| 2020/0205621 A1 | 7/2020 | Osborne, Jr. |
| 2020/0229659 A1 | 7/2020 | Osborne, Jr. |
| 2020/0390295 A1 | 12/2020 | Osborne, Jr. |
| 2021/0113033 A1 | 4/2021 | Osborne, Jr. |
| 2021/0330142 A1 | 10/2021 | Osborne, Jr. |

OTHER PUBLICATIONS

International Search Report and Written Opinion for PCT/US2016/038135, mail date of Sep. 15, 2016.
International Search Report and the Written Opinion of the International Searching Authority for PCT/US2019/033341; mailed Sep. 25, 2019.
U.S. Appl. No. 15/173,970, filed Jun. 6, 2016.
U.S. Appl. No. 15/185,776, filed Jun. 17, 2016.
U.S. Appl. No. 15/185,937, filed Jun. 17, 2016.
U.S. Appl. No. 15/848,643, filed Dec. 20, 2017.

\* cited by examiner

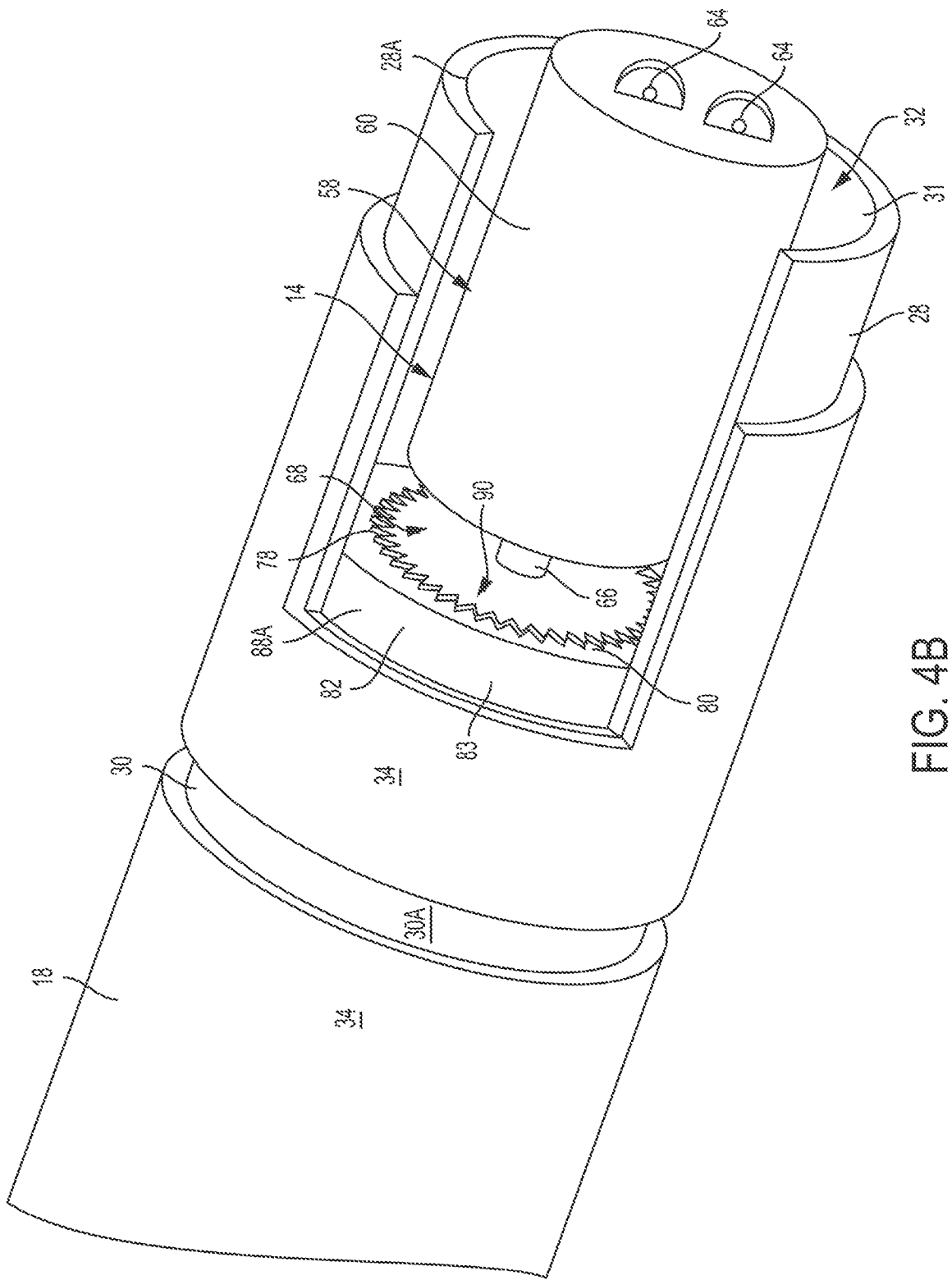

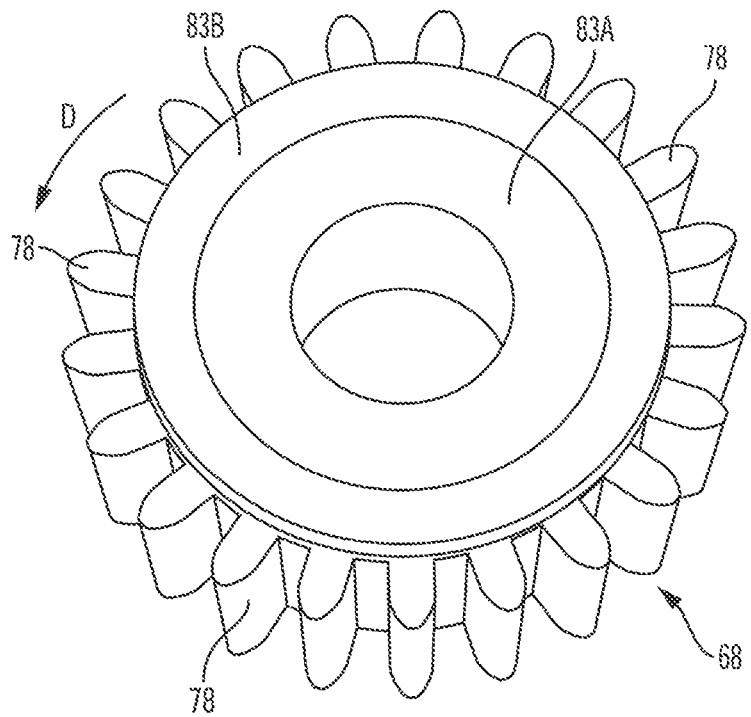
FIG. 10A
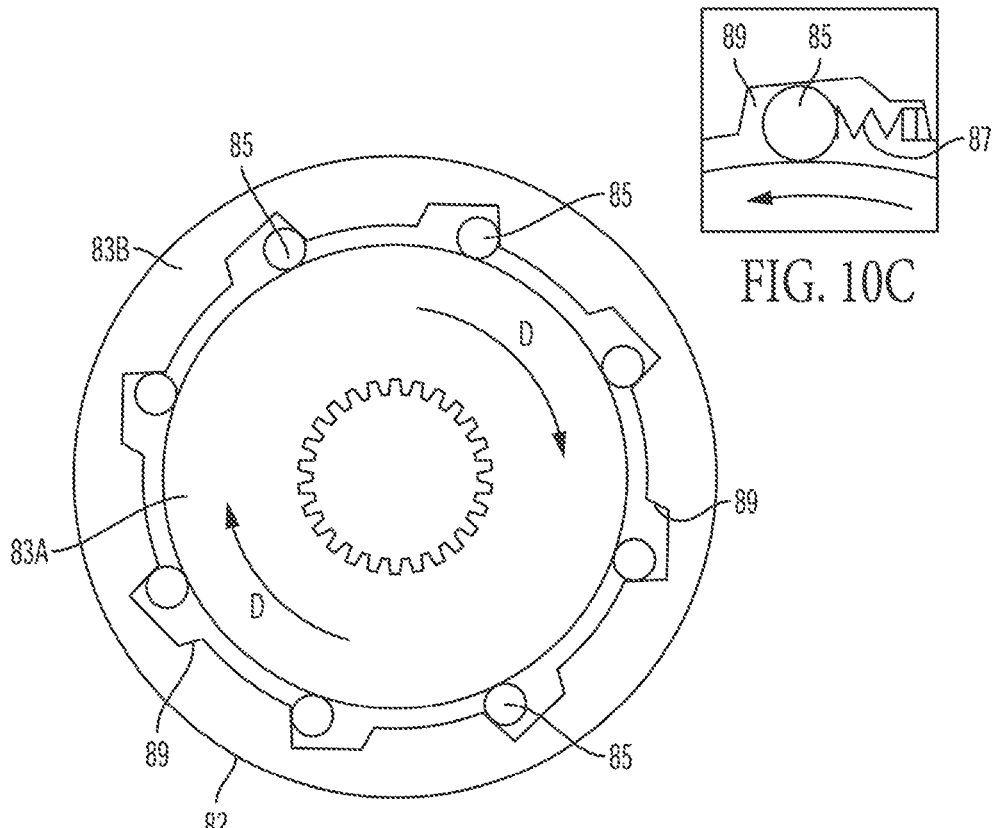
FIG. 10C
FIG. 10B

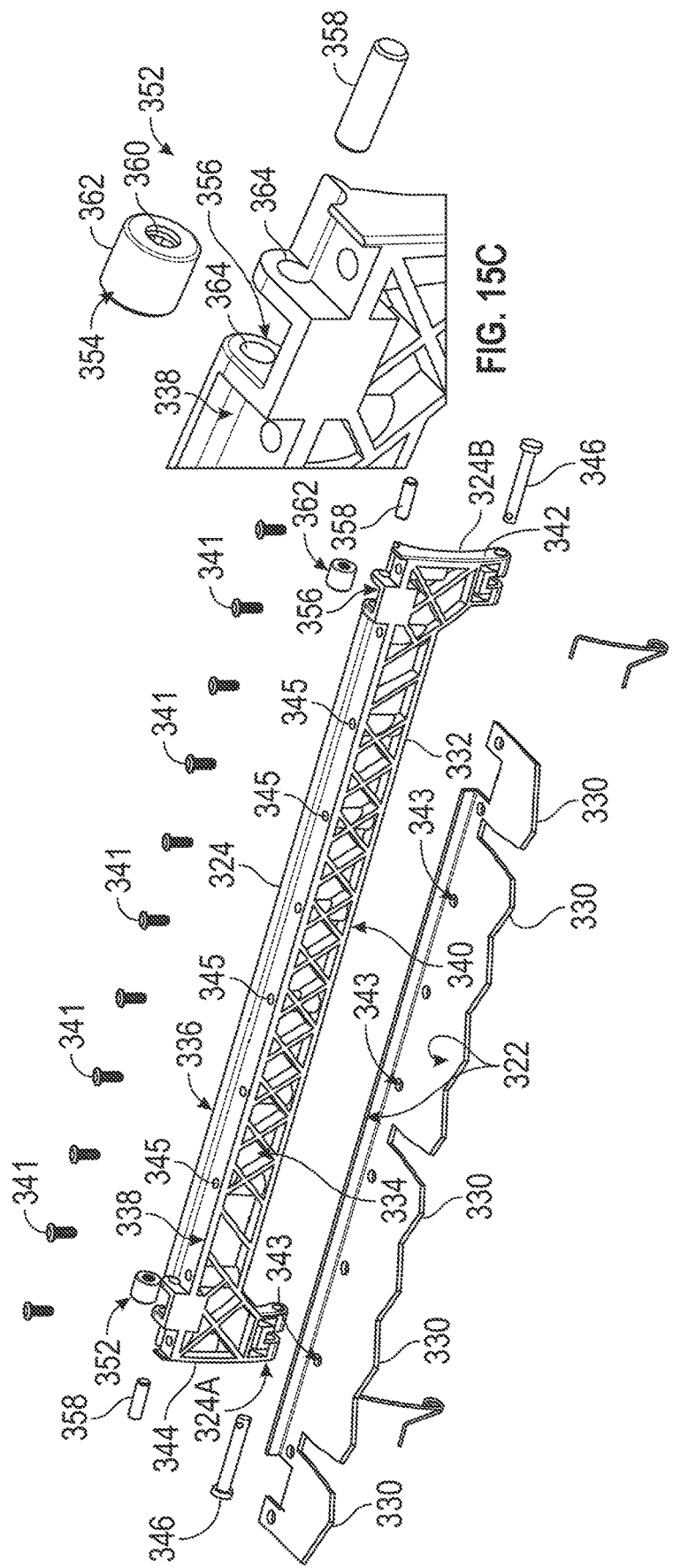

DISPENSER FOR ROLLED SHEET MATERIALS

CROSS REFERENCE TO RELATED APPLICATIONS

The present patent application is continuation of previously filed, co-pending U.S. patent application Ser. No. 15/988,579, filed May 24, 2018.

INCORPORATION BY REFERENCE

The specification and drawings of U.S. patent application Ser. No. 15/988,579, filed May 24, 2018, are specifically incorporated herein by reference as if set forth in their entireties.

TECHNICAL FIELD

This disclosure generally relates to dispensers and, more particularly, to electronic dispensers for flexible sheet material such as paper products.

BACKGROUND

A number of different types of dispensing devices for controlling quantities of paper products dispensed, such as for restroom and other environments, have been developed in recent years. Some such dispensers have included mechanical paper feeding mechanisms, actuated by the user physically touching the dispenser equipment to deliver a fixed length of paper. Such bodily contact can, however, raise concerns over hygiene when such dispensers are located in public areas, such as in public restroom facilities. More recently, the use of electronic dispensers has become more prevalent, especially in public restroom facilities. Similar to manually operated dispensers, electronic dispensers dispense a measured length of sheet material, but their operation generally is initiated by a sensor detecting the presence of a user. Thus, in such "hands free" operations, the user does not have to manually activate or otherwise contact the dispenser in order to initiate a dispense cycle. While electronic dispensers generally are more hygienic and can enable enhanced control of the amount of paper fed, such dispensers can be subject to other problems. For example, conventional electronic dispensers typically include motors, gears, and/or other drive components or systems that can be expensive and require closer tolerances to manufacture and install/operate within the dispenser. In addition, such dispensers can accumulate static electricity, such as due to the movement of the sheet material over rollers, interactions between rollers, etc., and, if not dissipated, can cause the user to receive a static shock, as well as possibly affecting the electronic control and sensor circuitry of the dispenser. Still further, the operation of these dispensers often is loud, generating substantial noise during operation.

Accordingly, it can be seen that a need exists for a dispenser that provides for a consistent controlled dispensing or feeding of desired amounts of a sheet material, and which addresses the foregoing and other related and unrelated problems in the art.

SUMMARY

Briefly described, in one aspect, the present disclosure includes a dispenser for dispensing a flexible, rolled sheet material. The dispenser typically includes a dispenser housing with a supply of the sheet material supported therewithin, and a drive or feed mechanism. During a dispensing operation, a length or portion of the sheet material will be along a dispensing or feed path/path of travel defined through the housing and to a discharge.

The feed mechanism of the dispenser can include a manual drive or, alternatively, can include a motor driven drive or feed roll assembly. In one aspect, the feed roll assembly can include a feed roller rotatably mounted within the housing and arranged along the path of travel of the sheet material. The feed roller can comprise a body having a chamber defined therein, and an exterior surface that at least partially engages the sheet material for feeding or dispensing thereof.

One or more pressing rollers further can be positioned adjacent the feed roller. The pressing rollers also can be biased toward the body of the feed roller sufficient to engage the sheet material between the one or more pressing rollers and the feed roller so that the sheet material is pulled therebetween and from the supply for feeding along the dispensing path upon rotation of the feed roller during a dispensing operation.

Additionally, the dispenser can include a cutting mechanism or assembly at least partially disposed within the chamber defined by the body of the feed roller. The cutting assembly can include a cutting blade coupled to at least one movable support. The at least one moveable support further can be operatively connected to the body of the feed roller so as to be actuated with rotation thereof to cause the cutting blade to be moved into and out of one or more openings defined along the body of the feed roller and at least partially cut, score, or perforate the sheet materials after or during a dispensing operation with the feeding of a selected portion of the sheet material.

The cutting assembly further can include a cam follower that is connected to the at least one moveable support, and which engages and rides along a cam surface or track positioned within the chamber of the body of the feed roller as the feed roller is rotated to cause movement of the cutting blade into and out from the one or more openings in the body of the feed roller.

The at least one moveable support also may be biased, e.g., by one or more biasing members, to urge the cam follower into engagement with the portion or track.

In other aspects, the cutting assembly can include a substantially fixed cam member mounted within the chamber of the feed roller body such that the feed roller and the cutting mechanism are rotatable thereabout. The cam member can have at least one protrusion configured to be engaged by the cam follower to cause rotation or pivoting of the at least one support sufficient to move the cutting blade out of the feed roller body for at least partially cutting, scoring, or perforating the sheet material.

The protrusion of the cam member can have various configurations, including having one or more curved or arcuate surfaces configured to engage the cam follower, in response to which, the cutting blade is moved out of the feed roller body for at least partially cutting, scoring, or perforating the sheet material without scrapping, tearing, and/or ripping thereof.

One or more biasing members further can be connected to the body of the feed roller to assist rotation thereof and movement of the cutting blade into and out from the one or more openings for at least partially cutting or perforating the selected portion of the sheet material.

In one aspect, the dispenser can be provided with a feed roll assembly including a motorized or driven feed roll for dispensing the flexible sheet material, such as from a supply roll mounted in a holder, in response to a signal from an electronic sensor. One or more pressing rollers can at least partially engage the sheet material against the feed roller to cause the sheet material to be pulled or drawn therebetween and dispensed along a dispensing path extending between the pressing and feed rollers and through the discharge of the dispenser. The motorized feed roller further can have a drive mechanism or system including a motor that can be at least partially received within the internal chamber or recess of the feed roller body so as to be at least partially or substantially integrated therein. The drive mechanism can be operable in response to a signal(s) from the electronic sensor and/or a dispenser control system to rotate the feed roll as needed to feed a measured or desired amount of sheet material from the roll.

In another aspect, the motor may be coupled to the feed roller by a gear assembly that is configured to selectively transfer torque from a driveshaft of the motor to the feed roller for driving the dispensing of the sheet material. In addition, or alternatively, the feed roll assembly can include a gear reducer assembly, which can comprise one or more planetary gear arrangements or other suitable gearing or other driving arrangements linking the motor to the body of the feed roller. The gear assembly further may comprise or be configured to act as a hybrid or one-way clutch, allowing the motor to engage and drive the feed roller, while also allowing the feed roller to be rotated independently, for example, for manually dispensing a selected amount of sheet material.

The one or more pressing rollers generally will be biased toward the feed roller so as to be maintained substantially in frictional engagement, driving contact therewith. Each pressing roller or multiple pressing rollers, when more than one pressing roller is used, can be biased individually or together toward engagement with the feed roller, and further can be driven by operation of the feed roller. Still further, in some embodiments, the one or more pressing rollers can be additionally or separately driven such as by a gear or a belt drive arrangement, including a drive belt driven by the driving of the feed roller, and which belt additionally can provide biasing of the one or more pressing rollers toward the feed roller.

In another or alternative aspect, the dispenser also can include a pivotally mounted pawl member located proximate to a tear bar or other cutting member such that movement of sheet material against or toward the tear bar for severance pivots the pawl member from a first position to a second position. A sensor or signal device cooperative with the pawl member can be located such that movement of the pawl member to its second position (or by a desired range of movement) causes the signal device to send a signal to notify the control circuit that the sheet material has been removed.

The dispenser can be operative in different modes. For example, in a first mode the dispensing operation can be responsive to a signal from the proximity sensor to dispense a sheet of material. In addition, or in the alternative, the dispenser can be operable in a second mode to dispense a next sheet in response to the signal means being activated by movement of the pawl member to the second position.

In some additional embodiments, an actuatable or movable cutting blade or other cutting mechanism also may be provided and arranged along the body of feed roller. The cutting blade may extendable between retracted and extended positions for cutting, scoring, or perforating select portions of the sheet material.

In still a further aspect, the dispenser can include a proximity or other sensor for initiating operation of a dispensing mechanism, which sensor can have an adjustable range of coverage or focus; and a tear bar mounted within the housing for severance of the sheet material by the user. A pivotally mounted pawl member further can be located proximate to the tear bar such that movement of sheet material into the tear bar for severance pivots the pawl member from a first position to a second position. A detector, sensor, switch or similar signal means or actuator that senses or is otherwise responsive to movement of the pawl member can send a signal to notify the control circuit that the sheet material may have been removed from the discharge chute upon movement of the pawl member to the second position. A paper detection sensor also can be activated by the control circuit to verify that the sheet material has been removed from the discharge chute. The dispenser further can be operative in one mode to be responsive to a signal from the proximity sensor to dispense a sheet of material, and/or can also be operative in a mode wherein a next sheet is dispensed in response to a signal from the paper detection sensor that the sheet material has been removed from the dispenser.

The electronic dispenser also can be configured to be operable in a number of additional modes, including a proximity detection mode in which a proximity sensor detects the presence of a user's hand when placed into proximity with the dispenser, and a butler mode in which the dispenser can automatically dispenses another measured amount of sheet material. Additionally, the electronic dispenser can include a dispenser housing having a support for rotatably holding at least one roll of sheet material, a base for mounting to a surface, a removable cover mounted to the base, and a discharge for discharging the sheet material from the dispenser. The dispenser further can include a control system or circuit that controls the operation of the motorized spindle or feed roller for dispensing the sheet material, and can include an adjustable proximity or other sensor.

These and other advantages and aspects of the embodiments of the disclosure will become apparent and more readily appreciated from the following detailed description of the embodiments and the claims, taken in conjunction with the accompanying drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

FIG. 4B provides a partial cutaway view of a feed roller drive assembly housed within the feed roller body of the dispenser according to FIG. 3.

FIGS. 10A-10C show an example clutch assembly for the feed roller drive assembly according to principles of this disclosure.

FIGS. 15A-15C illustrate exploded views of a cutting assembly/system according to an additional aspect of the present disclosure.

DETAILED DESCRIPTION

The following description is provided as an enabling teaching of embodiments of this disclosure. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the embodiments of the invention and not in limitation thereof, since the scope of the invention is defined by the claims.

Figure 1:
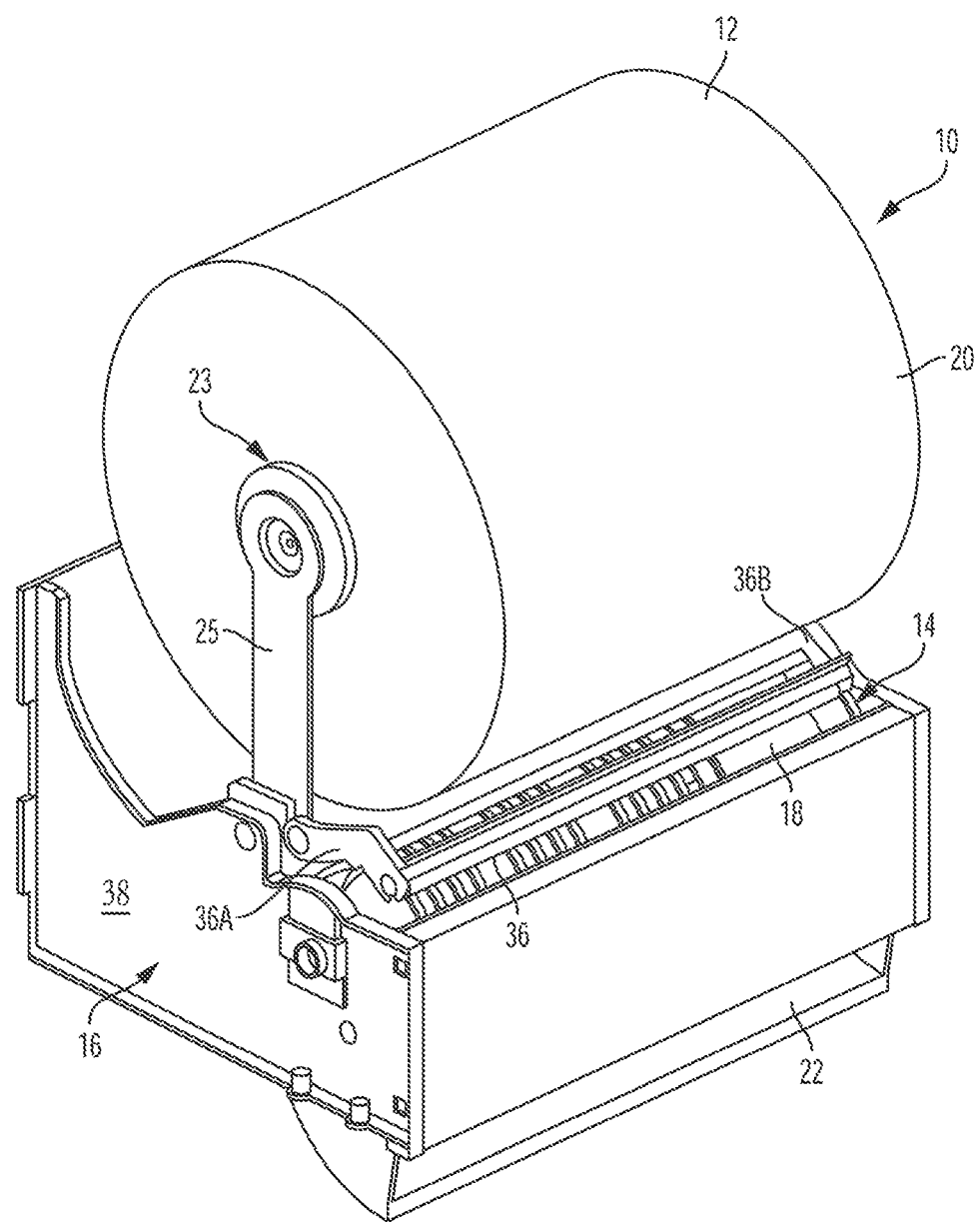
FIG. 1 shows a partial cutaway, perspective view of an example dispenser according to principles of the present disclosure.
Figure 2A:
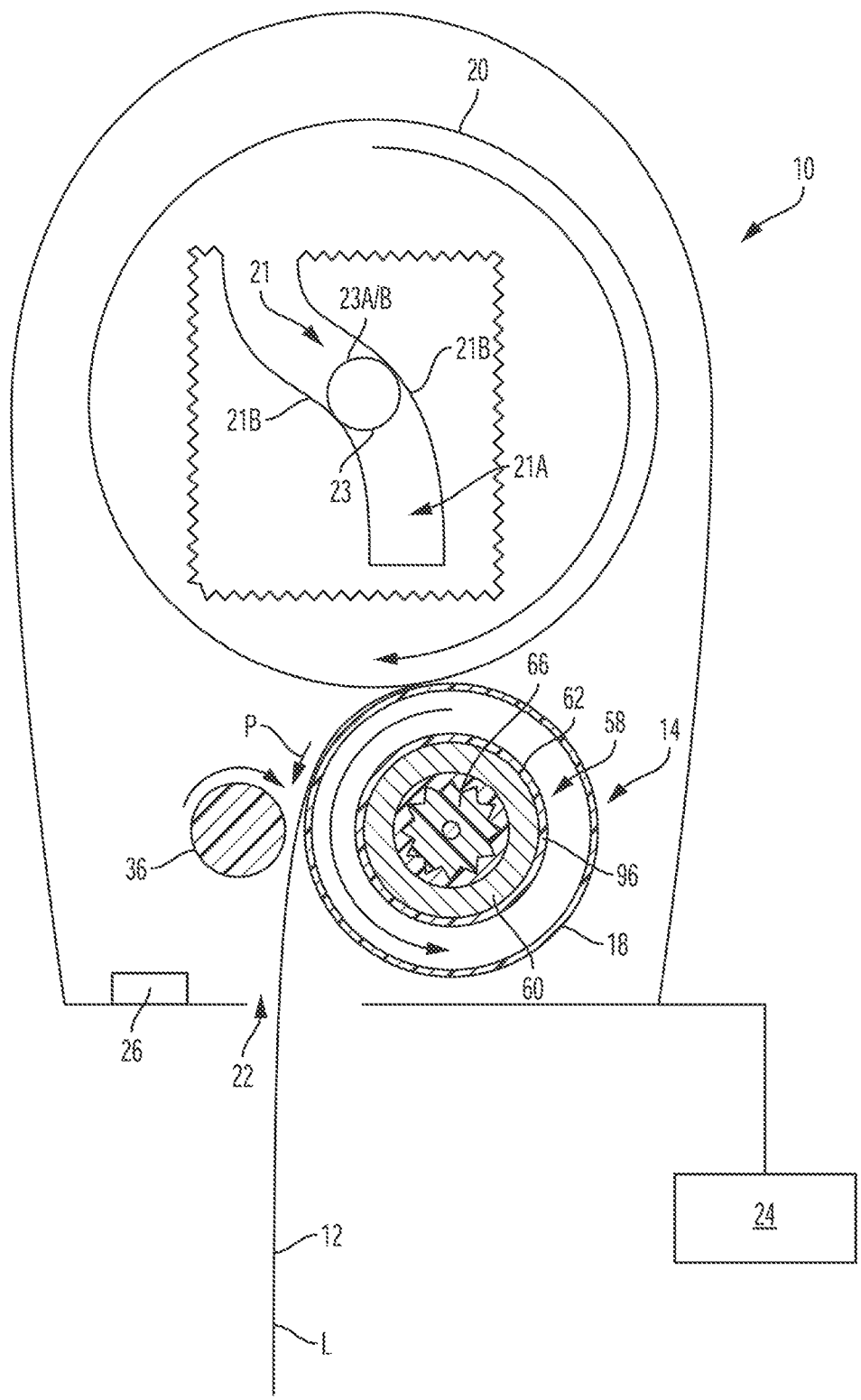
FIGS. 2A-2C show cross-sectional views of example dispensers according to principles of this disclosure.
Figure 2B:
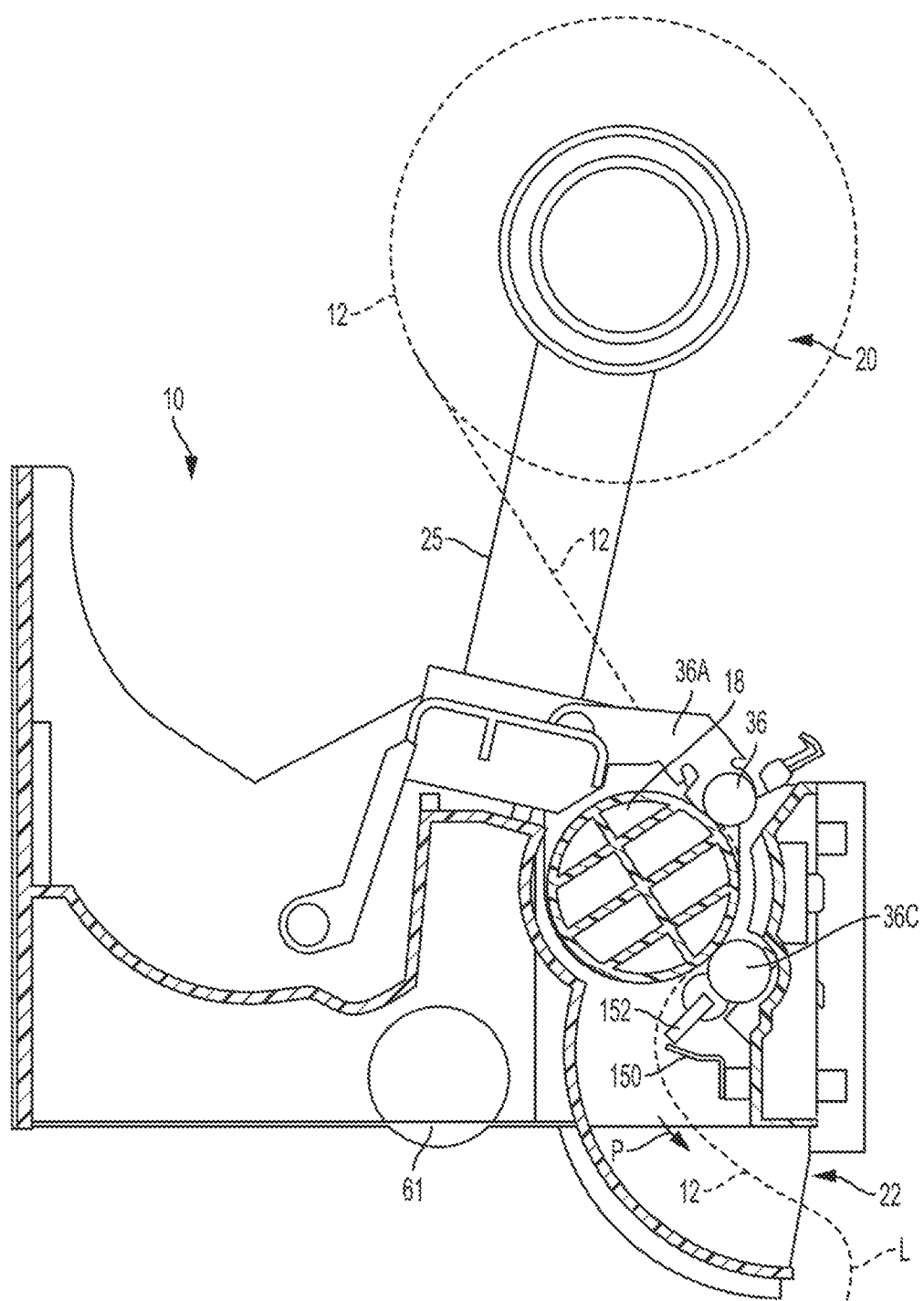
Figure 2C:
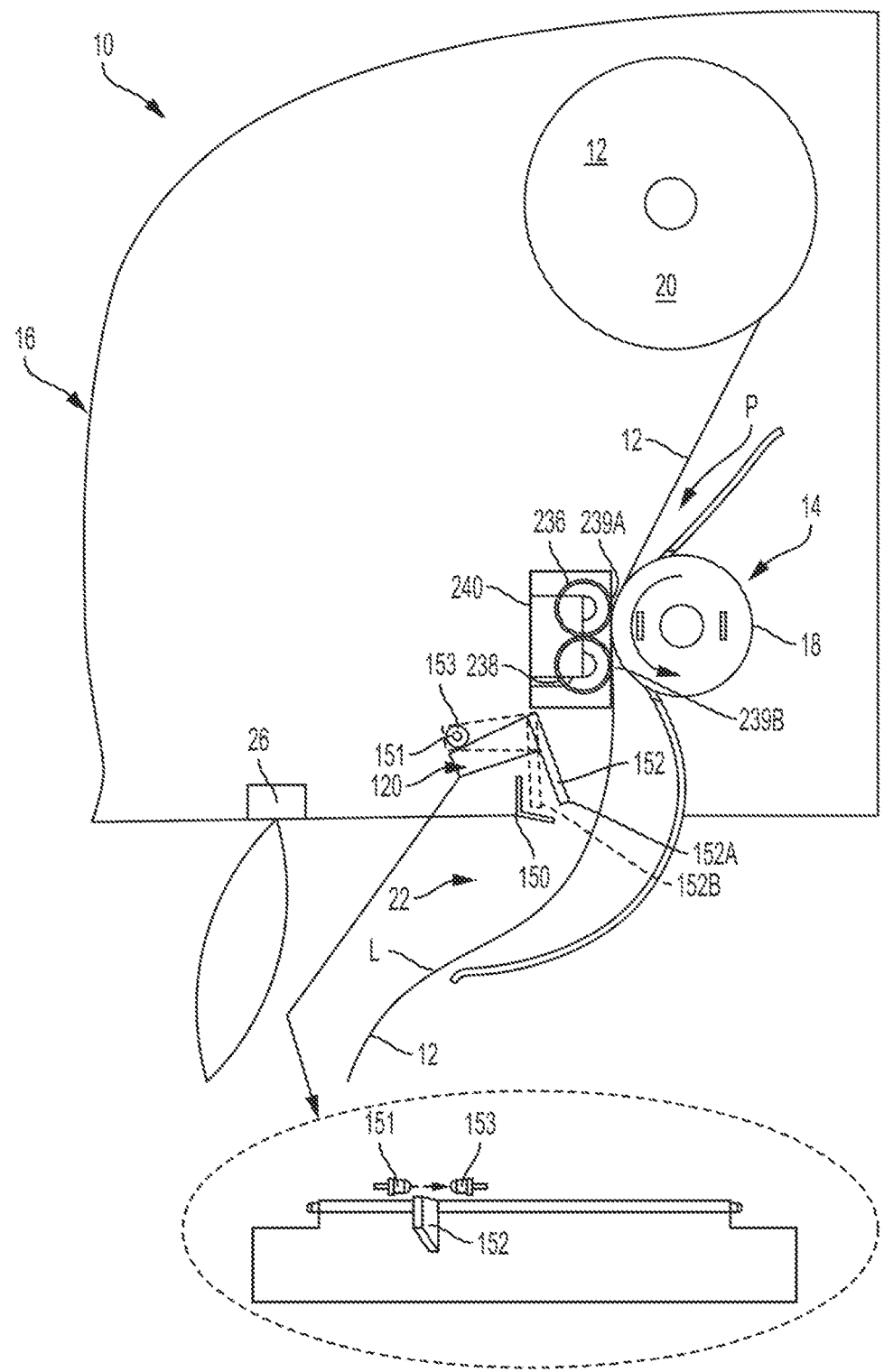

As generally illustrated in FIGS. 1-20, the present disclosure is directed to a dispenser 10 for feeding or dispensing a flexible sheet material 12 (FIGS. 1-2C). The dispenser 10 generally can include a feed roller drive assembly 14 mounted/disposed within a dispenser housing 16, and which can be manually operated or can include a motorized/driven feed roller. Upon activating or use of the dispenser 10, the feed roller drive assembly 14 for dispensing sheet material will be engaged, causing rotation of a motorized feed roller or drive spindle 18, thereby resulting in conveyance of a measured or selected amount or length L of sheet material 12 along a conveying or feed path P (FIGS. 2A-2C) from a roll or supply 20 of the sheet material 12 through the feed roller drive assembly 14 and out of a dispensing throat or discharge chute 22 or other suitable aperture or opening provided/defined in the housing 16, as generally indicated in FIGS. 1 and 2A-2C. It further should be appreciated that the electronic dispenser 10 described herein should not be considered to be limited to any particular style, configuration, or intended type of sheet material. For example, the dispenser 10 may be operable to dispense paper towels, toilet tissue, or other similar paper or sheet materials, including dispensing or feeding non-perforated and/or perforated sheet materials.

FIGS. 2A-2C show examples of dispensers including the motorized or driven feed roller assembly 14 for actively feeding or driving the sheet material 12 from the supply 20 and through the discharge chute or opening 22 of the housing 16, for example, upon receiving a signal from a control system 200 (FIG. 20), which includes a controller or processor 24, as generally indicated in FIG. 2A. The controller 24 for the dispenser 10 can receive a plurality of signals from a sensor or an array or series of sensors, such as generally indicated at 26, to control dispensing of the sheet material 12. These one or more sensors 26 can include various type sensors or detectors, for example, including an adjustable proximity sensor that can be configured/adjusted to detect the presence of a user's hand at a desired range/location and dispense measured/selected amounts of sheet material 12, as well as a photoelectric, infrared (IR) or similar sensing systems/detectors, used to detect the presence of a user's hands placed below the bottom portion of the dispenser housing, and/or the feeding of a selected amount of sheet material 12.

As indicated in FIG. 2A, the dispenser housing 16 also will generally include a roll support mechanism 21, for holding at least one roll 23 of the supply 20 of sheet material 12. For example, as generally indicated in FIG. 2A, the roll support mechanism 21 can include slots or grooves 21A defined in the housing 16 configured to receive the first and/or second ends 23A/23B of the roll 23 of the sheet material 12 such that at least a portion of the supply 20 of sheet material 12 is supported by, and/or rests on or engages the feed roller 18. The slots or grooves 21A of the roll support mechanism further can include one or more angled or sloped portions 21B having a variable slope to increase/decrease the amount of force the supply 20 of sheet material exerts on the roller 18. For example, a slope can be selected such that as the supply 20 of sheet material is fed (e.g., the amount of sheet material 12 left on the roll decreases), the slope or position of the supply roll can change so as to keep a downward force exerted on the feed roller 18 by the supply roll substantially constant as the supply of sheet material, and likewise the weight thereof, is diminished as selected portions of the sheet material 12 are dispensed (FIG. 2B). Alternatively, as shown in FIGS. 1 and 2B, the supply 20 can be supported by a pair of arms 25 coupled to the dispenser housing 16. These arms 25 may be fixedly arranged to hold the supply 20 of sheet material in a spaced relationship with the feed roller 18 or, in the alternative, the arms 25 may be biased or urged, such as by a spring, other pre-stressed member or suitable biasing mechanisms, toward the feed roller 18 to urge or direct the supply 20 of sheet material downwardly toward or against the roller 18.

FIGS. 1-6C illustrate an example motorized drive or feed roller 18 of the embodiment of the feed roller drive assembly 14 of the electronic dispenser 10, which incorporates or comprises an integrated feed roller drive mechanism or system 58 therein. As indicated in FIGS. 3-5A and 6A-6C, the drive or feed roller 18 generally will include an elongated body 28, which can be made of a molded plastic, synthetic or other composite material, though other types of low or reduced static materials, such as wood and/or metal materials, which can include an insulating material thereabout, also can be employed.

Figure 3:
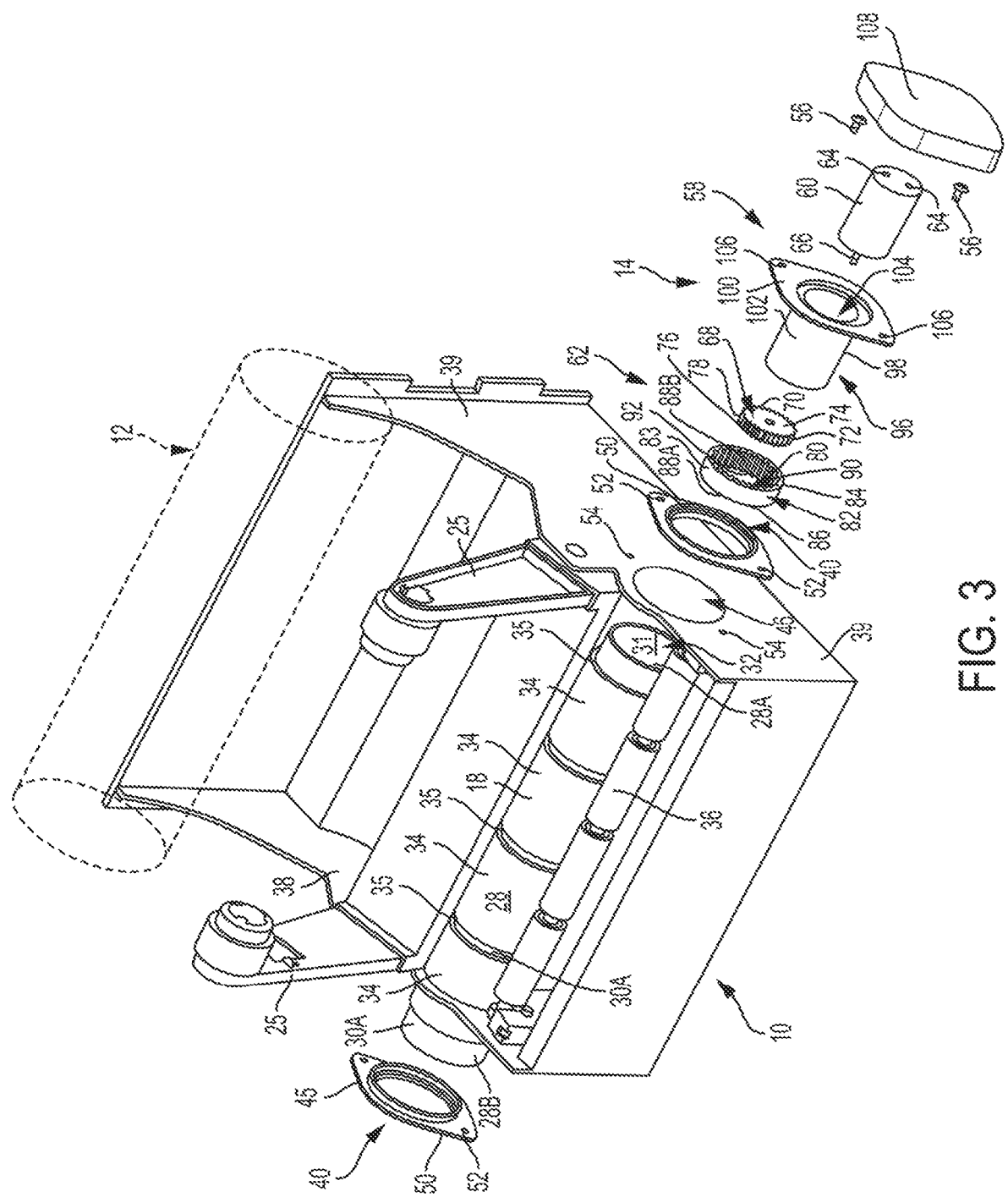
FIG. 3 shows an exploded view of the various components of the dispenser according to principles of this disclosure.

In addition, as further shown in FIGS. 3 and 6A-C, the feed roller body 28 may include first and second ends 28A/28B and a generally cylindrical outer side wall 30 and an inner side wall 31 defining an open ended passage, recess, or at least partially hollow cavity 32 defined within/along the feed roller body 28, and the feed roller body 28 may also include one or more driving bands 34 disposed on, or adhered to, an outer surface 30A of the side wall 30, such as a series of driving bands or sections 34 disposed on the outer surface 30A in a spaced arrangement or configuration (FIGS. 1 and 3). The driving bands 34 may at least partially include or be comprised of rubber, plastic, resin or other similar materials suitable to increase grip of the feed roller 18 and/or friction between the feed roller 18 and the sheet material 12 to thereby assist in the feeding or driving of the sheet material 12. In addition, the outer surface 30A of the feed roller body 28 also may include a series of recessed or gap sections 35 defined therein. It further will be understood that although the exemplary embodiments illustrated in FIG. 3 shows four substantially equally sized driving bands 34 disposed in a spaced relationship about the outer surface 30A of the feed roller body 28, any number, size, arrangement and/or configuration of driving bands may be used in accordance with embodiments of the present disclosure.

Figure 7A:
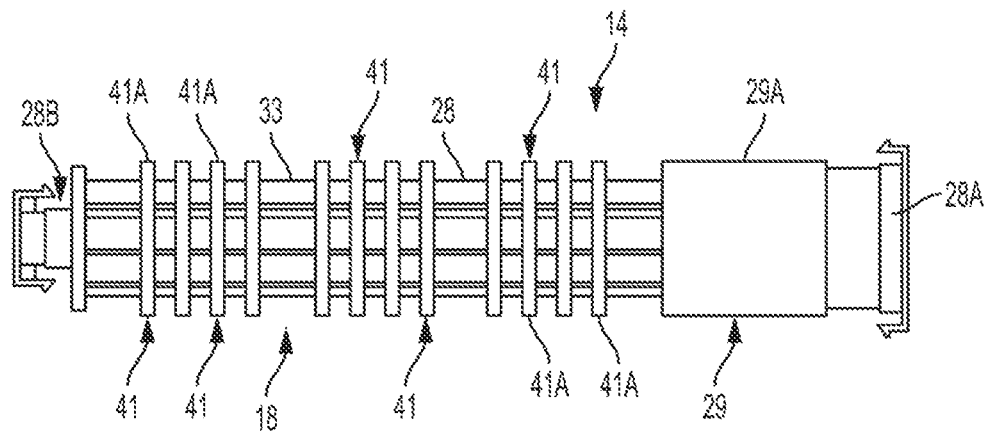
FIGS. 7A-7B show an example of a feed roller according to the principles of the present disclosure.
Figure 7B:
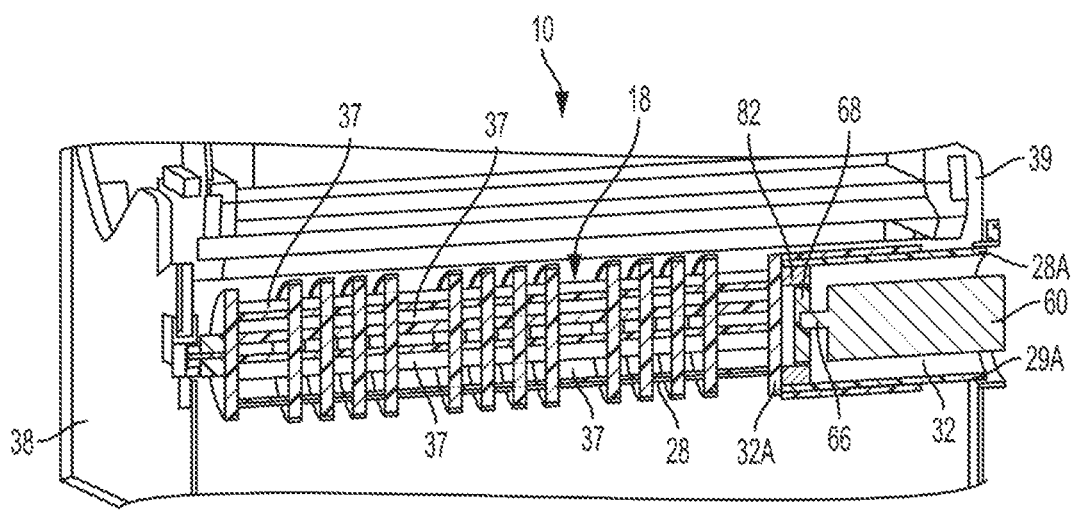

Alternatively, as generally shown in FIGS. 7A-7B, the feed roller body 28 can be made up of various sections or portions including a first section/portion 29 having, for example, a cylindrical sidewall 29A defining the open ended passage or at least partially hollow cavity 32 therealong, and a second, or other additional, section or portion 33 connected to and/or adjacent the first section 29 and which can be formed with a series of cutouts, pockets, or cavities 37 therein. Such a configuration may provide increased stiffness of the feed roller body 28, while also reducing the amount of material required for production, and thus potentially can help decrease manufacturing costs. The second portion/section 33 also may have a series of contact portions or flanges 41 disposed/arranged therealong, each with a contact surface 41A for engaging/driving the sheet material 12 as the feed roller body 28 is driven/rotated to feed the sheet material 12.

As shown in FIG. 3, the feed roller body 28 can be movably or rotatably mounted/attached to one or more walls or other portions of the dispenser housing 16, such as side walls 38/39. The first 28A and/or second 28B ends of the feed roller body 28 can be connected, mounted or otherwise coupled to the side walls 38/39 by one or more bearing assemblies 40, and/or including other suitable support mechanisms that support and allow for rotation of the feed roller body 28 in relation to the dispenser housing 16. The bearings 40 may include roller or ball bearings that can be contained, housed or otherwise disposed between bands or rings defining a bearing assembly or body 45. Embodiments of this disclosure are not, however, limited to roller/ball bearings, however, and may include plain, fluid, or magnetic bearings or any other suitable mechanisms for rotatably fixing the feed roller body 28 to or within the dispenser housing 16.

Figure 6A:
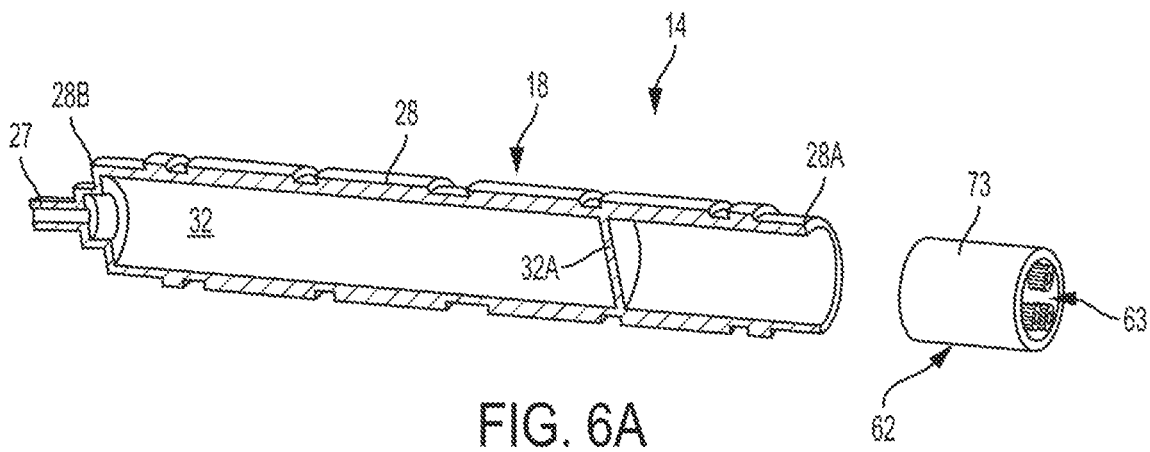
FIGS. 6A-6C illustrate one example construction of a driven feed roller assembly according to principles of this disclosure.
Figure 6B:
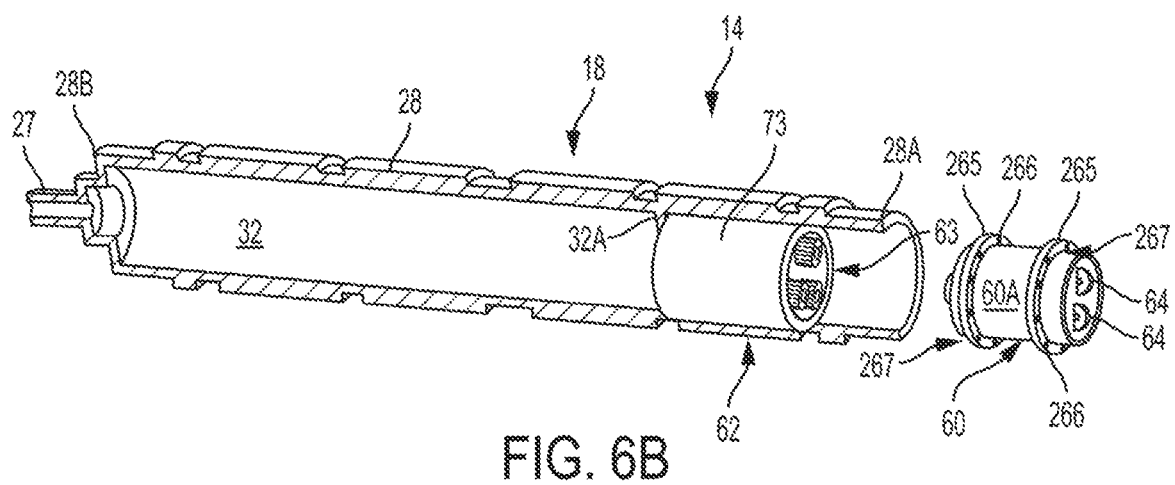
Figure 6C:
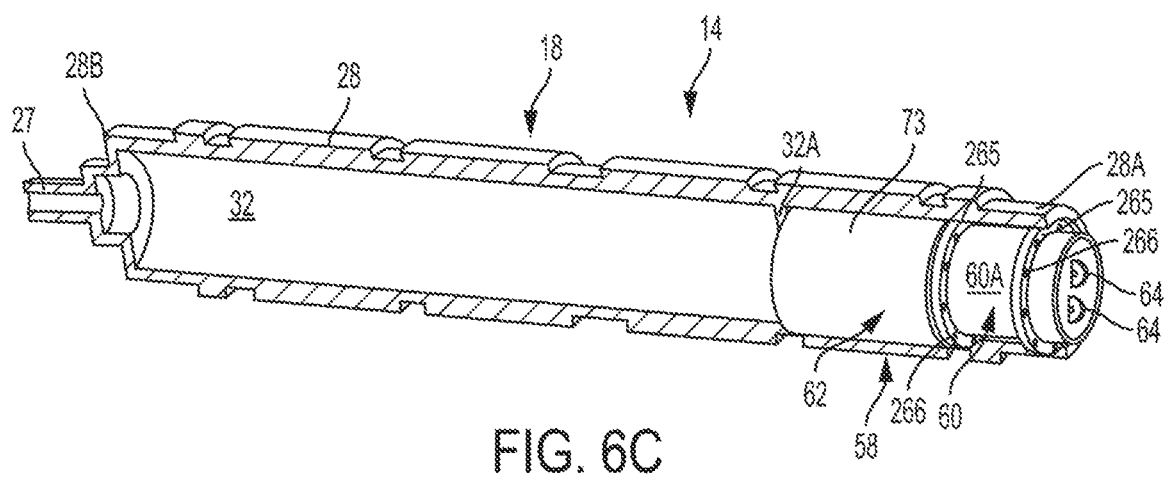

The first 28A and/or second 28B ends of the feed roller body 28 also may be rotatably mounted to the sides of the housing 16 by the bearing assemblies 40. For example, the first and/or second ends 28 A/B of the feed roller body 28 can be received through and engage the bearing assemblies 40 so as to be movable therein to enable the feed roller body 28 to rotate with respect to the dispenser housing 16. Though FIG. 3 shows the feed roller body 28 attached to the dispenser housing 16 at both the first and second ends 28 A/B, embodiments of the present disclosure are not limited to this arrangement and the feed roller body 28 can be attached to the dispenser housing 16 in any suitable manner. For example, an axle or shaft 27 may be engaged or otherwise affixed to or integrated with one, or both, of the ends 28A/B (e.g. the second end 28B) of the feed roller body 28, and further can be rotatably mounted to one of the sidewalls 38/39 of the housing 16, such as by a hub and/or bearing assembly or other suitable connection (FIGS. 6A-C).

Figure 4A:
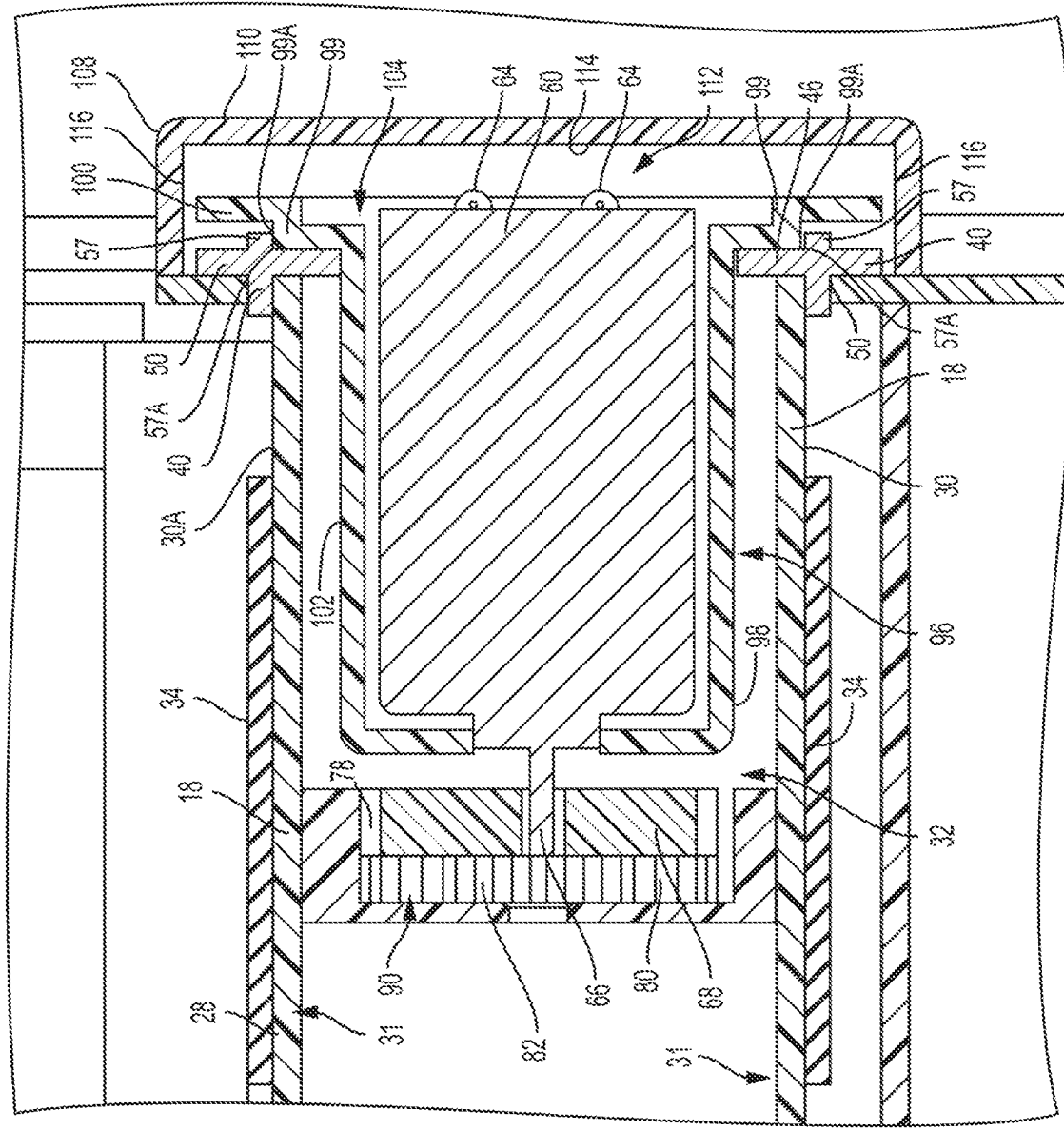
FIG. 4A schematically illustrates a cross-sectional view of a feed roller drive assembly for a dispenser such as shown in FIG. 3.

Referring to FIG. 3, the bearing assemblies 40 also can be at least partially received or housed within apertures or openings 46 defined in the side walls 38/39 of the dispenser housing 16, and each can include a flange or support portions 50 for connecting the bearing assemblies to an outer surface 38A/39A of the sidewalls 38/39 of the dispenser housing 16. In one example, the flange portions 50 may have a series of openings or apertures 52 defined or formed therein, which openings 52 are disposed/arranged to be substantially aligned with corresponding openings or apertures 106 and 54 defined or formed in the flanges 100 of a motor bracket or housing 96 and in side walls 38/39 of the dispenser housing 16. These openings can be further configured to receive fasteners, such as screws or bolts 56, to fixedly connect the flange portion 50 of the bearings 40 to the side walls 38/39 of the dispenser housing 16, and further mount the motor housing 96 thereover and to the housing 16 as shown in FIG. 4A. Other fasteners, including rivets, snaps, etc., also can be used. The flanges 50 of the bearings further may alternatively be fixed/secured to the sidewall 38/39 of the dispenser housing 16 using an adhesive or, alternatively, may be integrally formed with the dispenser housing 16.

As illustrated in FIGS. 1-3 and 8A-8B, the dispenser 10 further generally can include one or more pressing rollers 36; 236; 238 that can be biased toward engagement with the feed roller 18, so as to engage and force or press the sheet material 12 against the feed roller 18. The pressing roller(s) 36 can be movably mounted within the dispenser housing 16, such as with the ends thereof held within holders or brackets 36A/36B that can be biased toward engagement with the driven feed roller 18 such as by springs, biased cylinders or other suitable biasing mechanisms. The pressing rollers or a single roller where used, also can be biased independently toward the feed roller. The pressing roller(s) 36 further can include bands of a gripping material, such as a rubber or synthetic material, to assist in pulling the sheet material therebetween without causing damage to the sheet material as it passes between the feed roller and pressing roller(s). Additional pressing or guide rollers also can be arranged along the feed roller 18 to assist in guiding the sheet material, which additional rollers 36C (FIG. 2B) may be fixed or biased against the feed roller body 30, such as by springs, biased cylinders or other suitable biasing mechanisms (FIG. 2B).

Figure 8A:
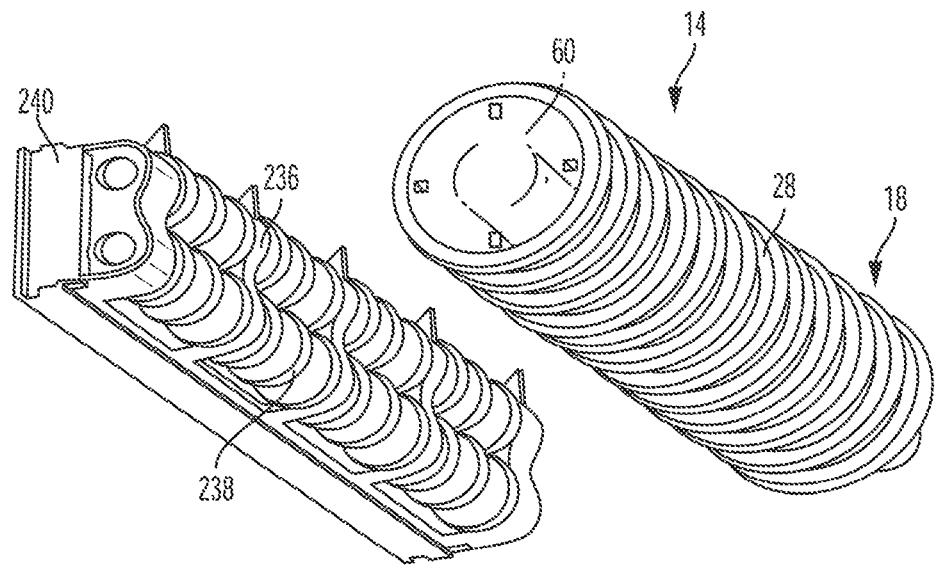
FIGS. 8A-8B illustrate perspective views of an example arrangement a feed and pressing rollers according to principles of this disclosure.
Figure 8B:
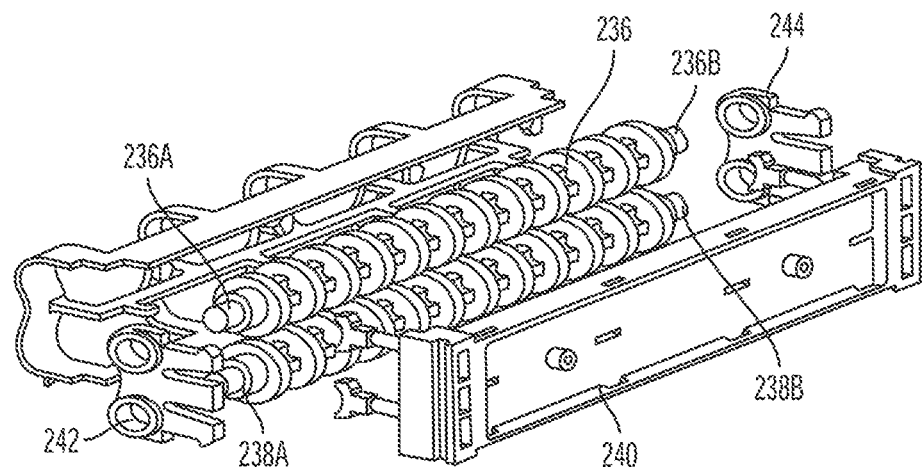

For example, a series of pressing rollers 236, 238 can be biased toward engagement with the feed roller 18, as indicated in FIGS. 8A-B, to engage the sheet material against the feed roller 18. The pressing rollers 236, 238 can be movably mounted within a housing 240, such as with the ends thereof (236A-B, 238A-B) held within holders or brackets 242, 244 that can be biased toward engagement with the feed roller 18 by springs, cylinders or other suitable biasing mechanisms. The engagement of the pressing rollers 236, 238 and feed roller 18 will define nip points 239A/B, as indicated in FIG. 2C, at upstream and downstream points along the feed path P of the sheet material 12 as the sheet material 12 is engaged and fed between the feed roller 18 and the pressing rollers 236, 238 of the motorized or driven feed roll assembly 14. The pressing rollers 236, 238 further can include bands of a gripping material, such as a rubber or synthetic material, to assist in pulling the sheet material therebetween without causing damage to the sheet material as it passes between the feed roller and pressing rollers.

Figure 9A:
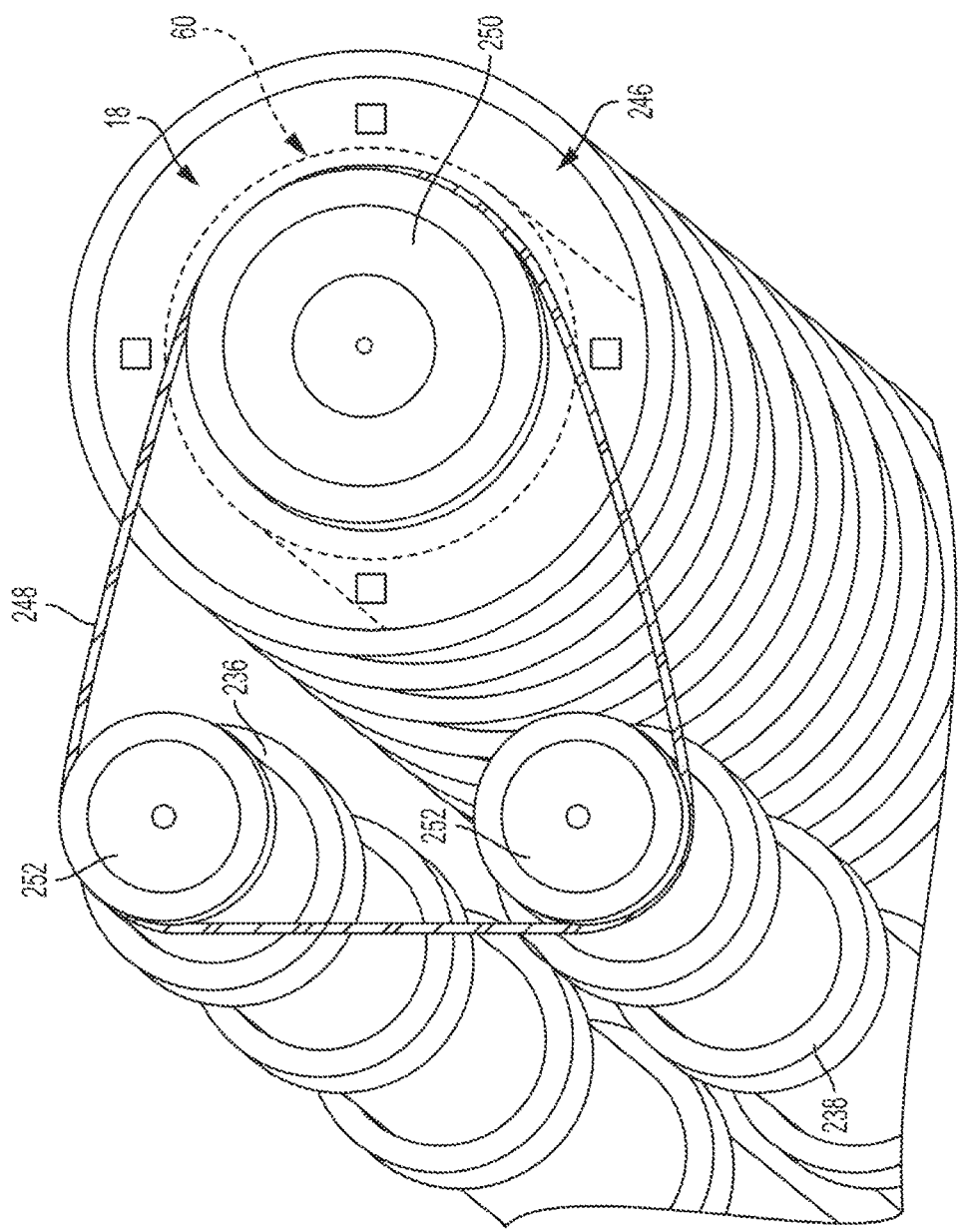
FIGS. 9A-9B show example drive mechanisms/arrangements for driving the pressing rollers according to principles of this disclosure.
Figure 9B:
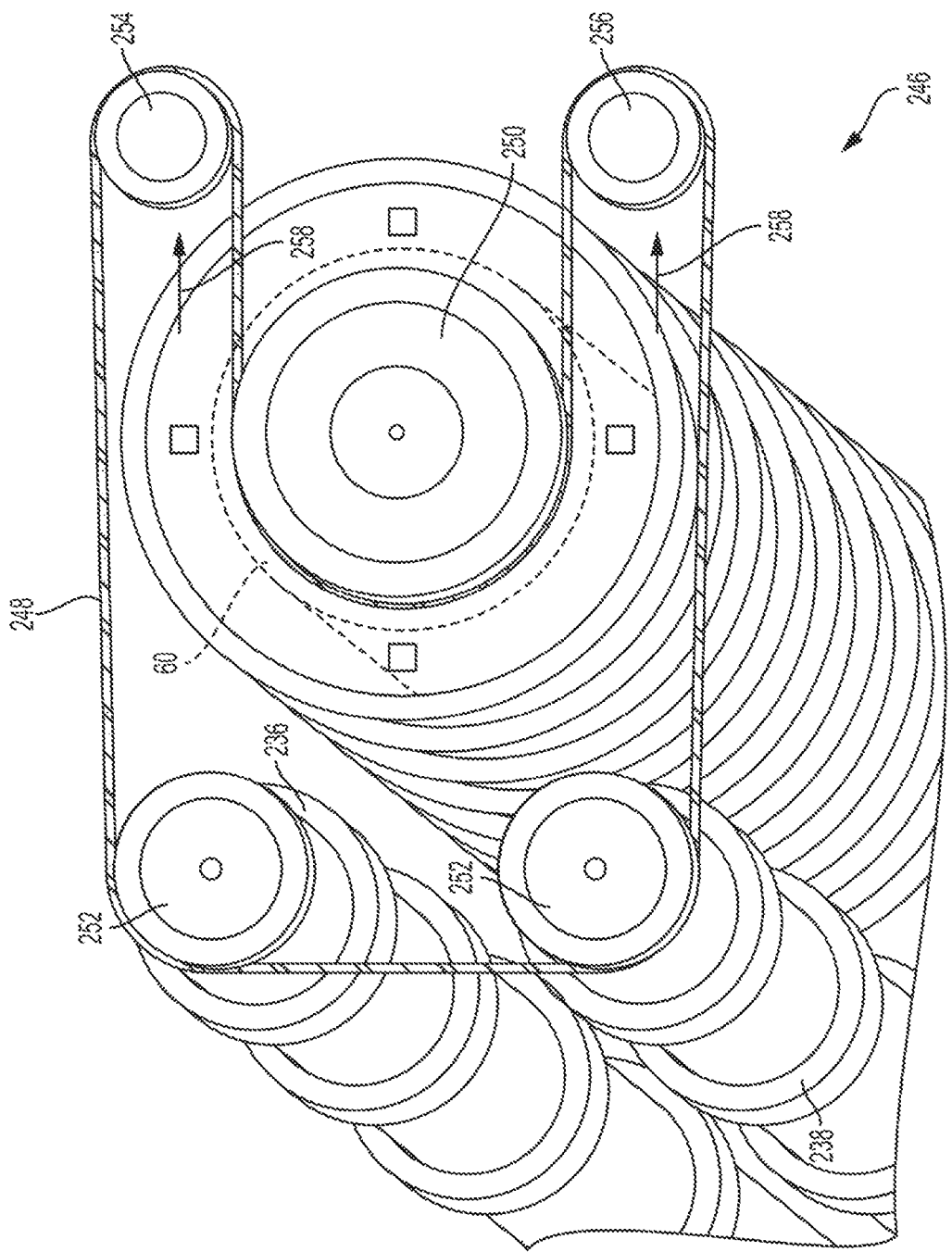

In addition, the pressing rollers 236, 238 may be driven by the motor 60 of the feed roller 18 so as to facilitate feeding of the sheet material 12. For example, as shown in FIGS. 9A-9B, the pressing rollers 236, 238 may be connected to a drive belt assembly 246 that is operatively connected to the motor 60 to transfer torque/power between the motor 60 and the pressing rollers 236, 238. The drive belt mechanism 246 can include a drive belt 248 that engages a belt gear, sleeve or pulley 250 fixed or otherwise connected or coupled to the feed roller 18 (so as to be driven thereby) and a series of belt gears, sleeves, or pulleys 252 fixed or otherwise connected to the pressing rollers 236, 238, e.g., at one or more ends 236A-B or 238A-B of the pressing rollers (FIG. 9A). In addition, the drive belt mechanism 246 further can include tensioning or idler pulleys, sheaves, gears, etc. 254/256 arranged/positioned adjacent the belt gear 250 fixed to the feed roller 18 and engaging the drive belt 248 (FIG. 9B). The pulleys 254/256 may be biased or urged in a predetermined direction (e.g., away from the pressing rollers as indicated by arrows 258) by a biasing member, such as one or more springs, to provide a substantially constant biasing force against, or to otherwise substantially maintain tension along, the drive belt 248. The magnitude of this biasing force or degree to which the drive belt 248 is tensioned may be selected such that the pressing rollers 236, 238 are urged toward and substantially maintained against and in contact with the feed roller 18, and/or so that the drive belt 248 is sufficiently tensioned to help prevent slippage between the drive belt 248 and the belt gear or belt pulleys of the pressing rollers 236, 238.

Embodiments of the present disclosure described herein can also utilize concepts disclosed in commonly-owned patents U.S. Pat. No. 7,213,782 entitled "Intelligent Dispensing System" and U.S. Pat. No. 7,370,824 entitled "Intelligent Electronic Paper Dispenser," both of which are incorporated by reference in their entireties herein. The embodiments also utilize concepts disclosed in published patent applications US 2008/010098241 entitled "System and Method for Dissipating Static Electricity in an Electronic Sheet Material Dispenser," "Electronic Dispenser for Flexible Rolled Sheet Material," and US 2014/026381241, entitled "Electronic Residential Tissue Dispenser," all of which are incorporated by reference in their entireties herein.

The driven feed roller assembly 14 will include the feed roller drive assembly/system 58, which can be at least partially received or housed within the open ended cavity or recess 32 of the feed roller body 28 so as to be substantially integrated with the feed roller 18 as generally illustrated in FIGS. 4A-4B and 5A-6C. The drive assembly 58 will include a driving mechanism, such as motor 60, and can include a gear arrangement/assembly 62 for transferring power generated by the motor 60 to the rotatable feed roller 18. The motor 60 can include a brushless servo or stepper motor or other, similar type of adjustable, variable speed electric motor, and can have connectors, such as a plug-in type connector including a pair of spaced prongs 64 (FIGS. 4A-4B) or other, similar connection through which the motor 60 can communicate with the control system of the dispenser and through which the motor 60 can receive instructions and power for driving the feed roller 18 so as to feed a selected or desired amount or length of sheet material through the discharge opening of the dispenser. The motor 60 can additionally provide feedback to the controller 24 (FIG. 20) of the dispenser control system 200, for example, to indicate a jam or misfeed and/or to further enable the controller 24 to monitor movement of the feed roller and thus control feeding of the sheet material. The motor also can include additional connecting leads or members to operatively connect the motor 60 to a power source, including, for example, one or more batteries 61 (FIG. 2B) or an electrical outlet.

Figure 5A:
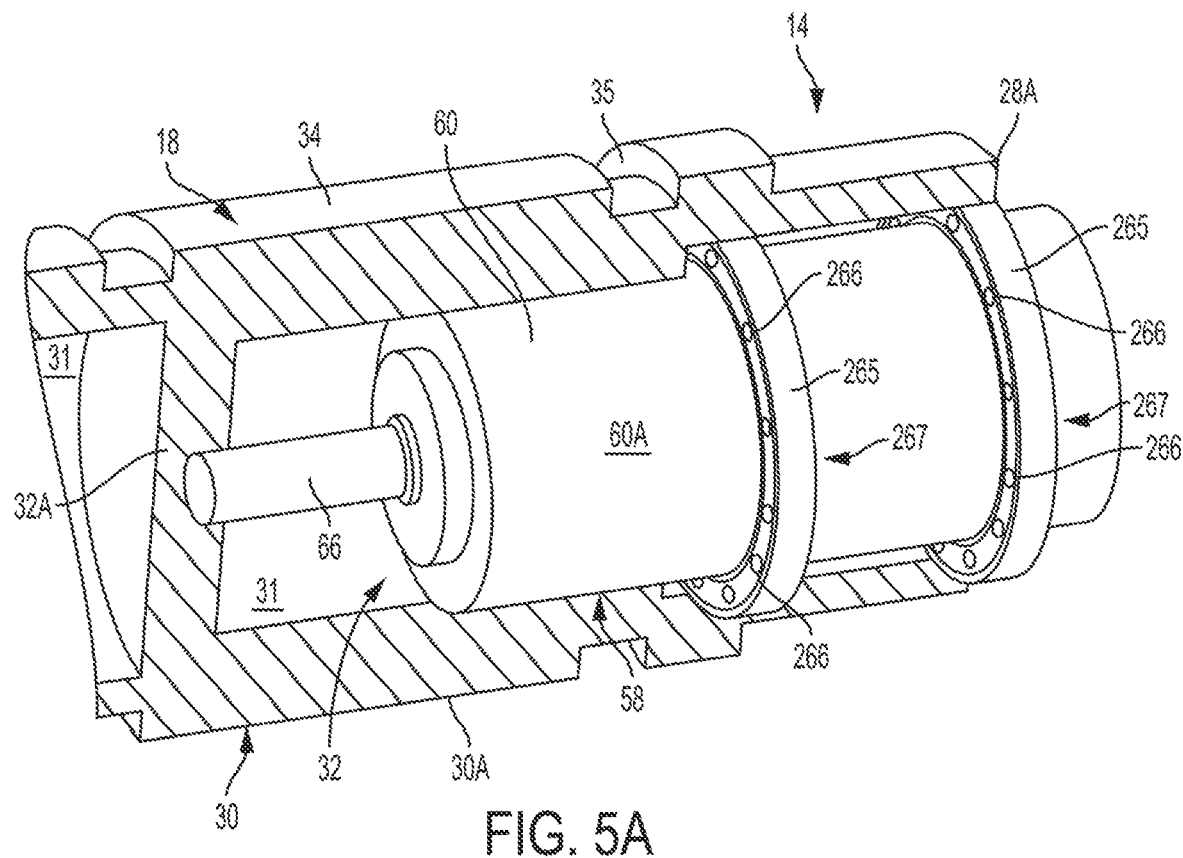
FIG. 5A illustrates example driving elements of a feed roller drive assembly according to principles of this disclosure.

As shown in FIG. 5A, the motor 60 can have a drive shaft 66 that connects directly to an interior partition or other portion 32A of the feed roller 18 so as to directly drive the rotation of the feed roller. The motor 60 further can be mounted within the cavity 32 of the feed roller 18 on bearing assemblies or mounts 265 which enable the motor 60 to remain substantially stationary as the feed roller 18 is driven and rotates thereabout. In addition, the drive assembly 58 also can include a gear arrangement/assembly 62 (FIGS. 4A-4B, 5B and 6A-6C) coupled to, or otherwise in communication with, the motor 60 to transfer power/torque from the motor 60 to the feed roller 18. This could include a gear reducer or other driving assembly to vary torque/driving force output from the motor and communicated to the feed roller.

In one example, the gear arrangement/assembly 62 may include an involute spline gear arrangement or configuration 62 (FIGS. 3 and 4A-4B). For example, as shown in FIG. 4A, the motor 60 generally may include the driveshaft 66 with a drive gear 68 of the gear arrangement/assembly 62 connected thereto, which drive gear 68 can include a drive gear body 70 with front 74, rear 76 and circumferential 72 sides or surfaces, and a series of gear teeth 78 disposed about/defined in the circumferential side/surface 72. The drive gear 68 can be receivable within a roller or spline gear 82, with the gear teeth 78 of the drive gear 68 generally configured to be matable with and engage a series of gear teeth 80 of a roller gear 82 coupled to, or otherwise communication with, the feed roller 18. The roller gear 82 generally will have a gear body 83 with front 84, rear 86 and outer/inner circumferential 88A/B surfaces or sides, and with an internal recess, cavity or opening 90 defined in the front surface 84 of the gear body 83, which recess 90 may be sized, dimensioned and/or configured to at least partially receive/house the drive gear 68 coupled to the driveshaft 66. The recess 90 generally may be defined by a substantially flat inner surface/side 92 and the substantially circular inner circumferential surface/side 88B, with the gear teeth 80 of the roller gear 82 defined/formed therealong.

Figure 11:
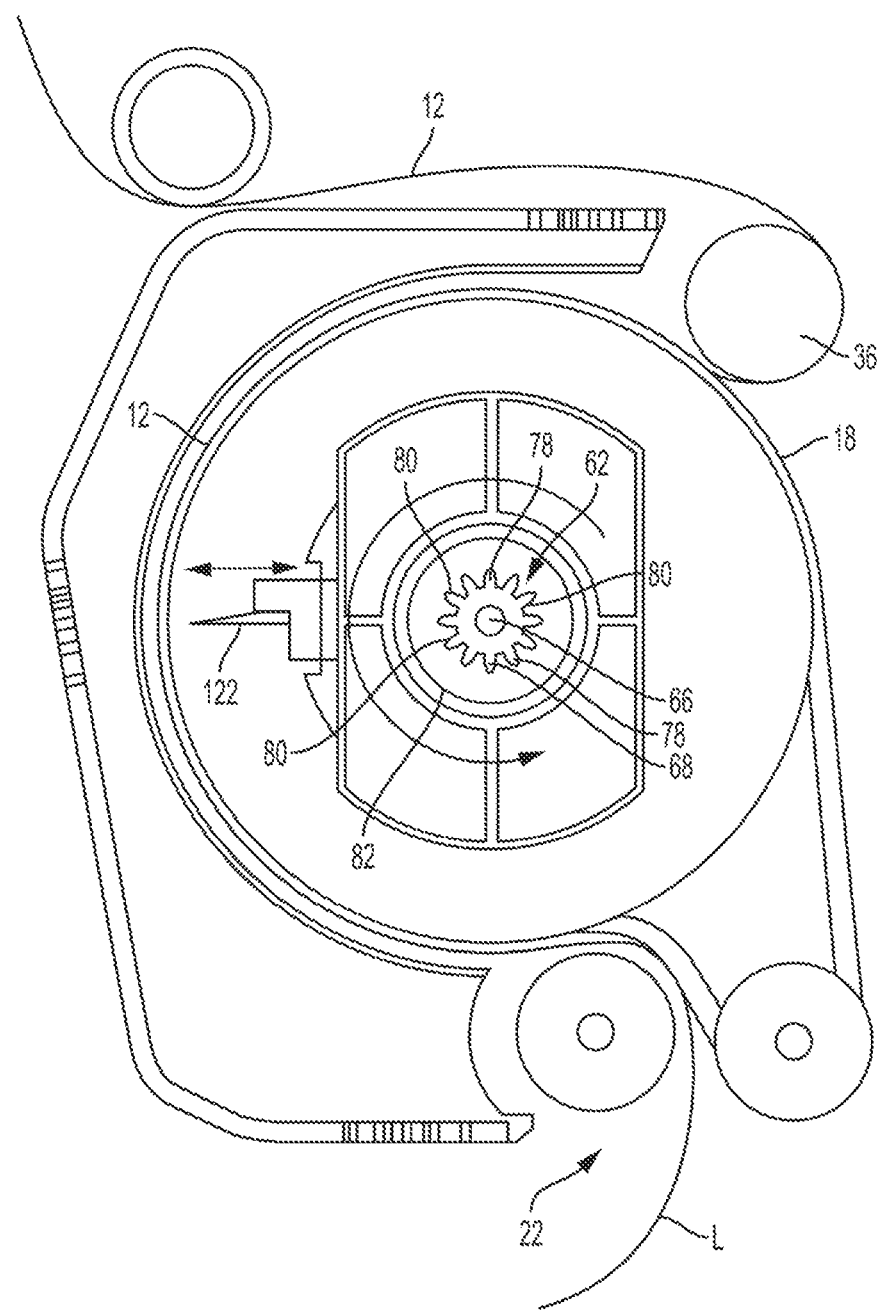
FIG. 11 provides a cross-sectional view of the feed roller drive assembly according to principles of this disclosure.
Figure 13:
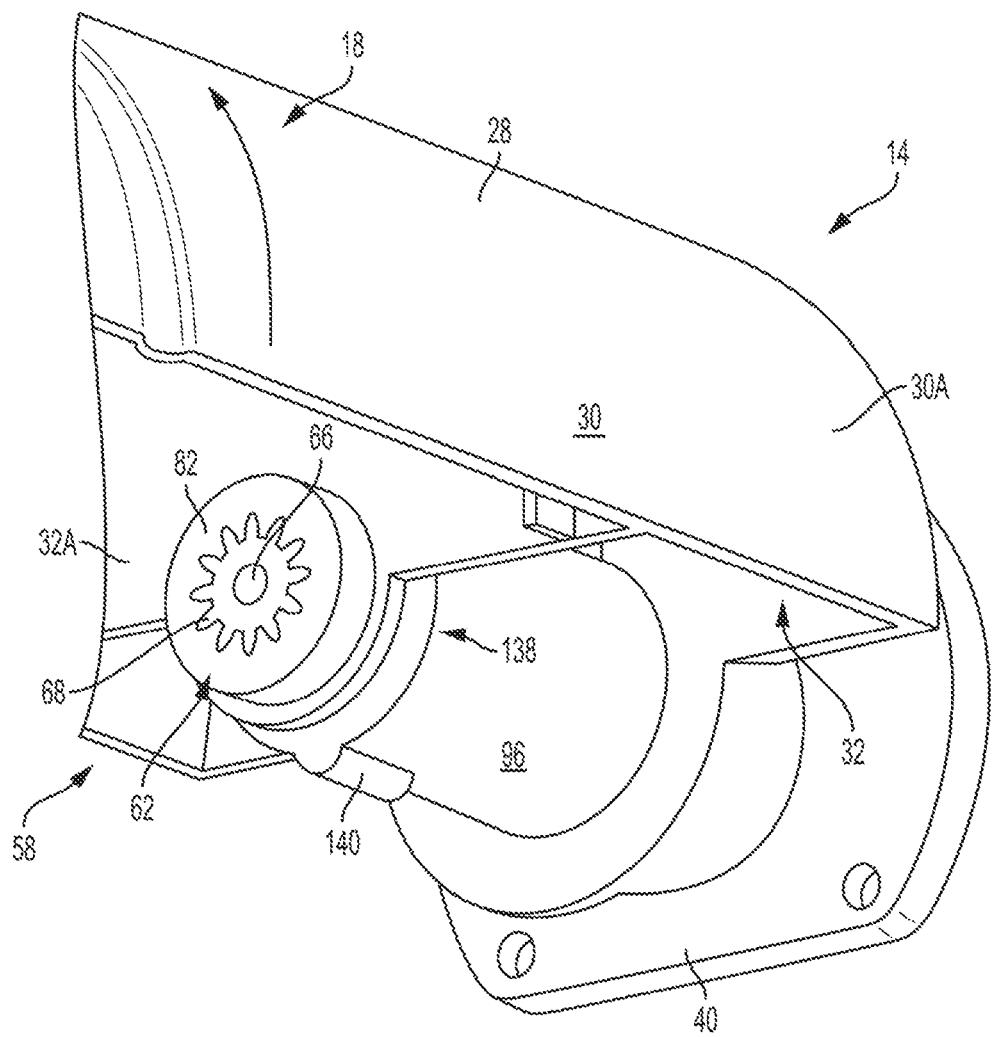
FIG. 13 illustrates a cutaway view of the drive assembly housed within the feed roller illustrated in FIG. 3.

Accordingly, as indicated in FIGS. 11 and 13, the drive gear 68 can be at least partially received within the recess 90 of the roller or spline gear 82 (FIGS. 4A-4B) so that the rear surface 74 of the drive gear body 70 is substantially adjacent and opposes the inner surface 92 of the roller gear 82 such that the teeth 78 of the drive gear 68 generally are mated or engaged with the teeth 80 of the roller gear 82, so that as the motor 60 drives/turns the drive gear 68, the teeth 78 of the drive gear 68 engage the teeth 80 of the roller gear 82 to transfer torque/power from the motor 60 to the roller gear 82 to drive the roller 18. The gear ratio between the arrangement/configuration of the teeth 78 of the drive gear 68 and the teeth 80 of the roller gear 82 may be set as needed to provide a desired driving force. For example, in some embodiments, the gear ratio can be approximately one-to-one (1:1) so as not to change the transmission of power or torque from the motor 60. However, other gear ratios can be utilized without departing from the present disclosure, such as gear ratios greater than, or less than, one to one (1:1) as needed to increase and/or decrease the power or torque transmitted from the motor 60 so as to allow for the use of, for example, smaller less powerful motors. Such an involute spline gear arrangement further can assist in the manufacturing of the dispenser 10 as relatively higher deviations may be permitted in the tolerances between the drive and roller gears 68/82, and such that the manufacturing thereof does not require substantially close, tight/restrictive tolerances that often come with other driving arrangements. It also will be understood that other gear drive arrangements, such as, by way of example, a planetary gear drive arrangement (FIG. 5B), can be provided as needed to adjust, reduce or increase the driving force provided by the motor for driving the feed roller.

The gear arrangement/assembly 62 (FIG. 13) further can be constructed or configured to act as a hybrid or one-way clutch assembly to allow for selective transfer of torque/power between the motor 60 and the roller 18 and/or allow for the roller 18 to freely rotate absent resistance of the motor 60. For example, when the motor 60 is powered on, the clutch assembly may lock/engage so to initiate communication between or operatively connect the drive gear 68 and roller gear 82 and provide transfer of power/torque between the drive gear 68 and the roller gear 82 thereby allowing rotation or driving of the roller 18 under the power of the motor 60. When the motor 60 is powered off, such as by being manually turned off or due to experiencing a loss of power or a low power condition, the clutch assembly may unlock or disengage such that there is no communication or operative connection between the drive gear 68 and the roller gear 82 to thereby allow for rotation of the roller 18 without resistance caused by rotation of the motor 60 so as to allow for manual dispensing of the sheet material, when a user applies a relatively small force thereto. The clutch assembly also may selectively disconnect/disengage the motor 60 if the sheet material is pulled as the motor 60 is driving the roller 18 so as to prevent damage to the motor, prevent jamming of the dispenser, and/or allow faster dispensing of sheet material.

The gear arrangement/assembly 62 constructed or configured to act as the hybrid or one-way clutch assembly further can be configured or constructed such that the drive gear 68 or, alternatively, the roller gear 82 may include one or more tracks/races, such as inner and outer races 83A/B, that may rotate together or independently of one another (FIGS. 10A-B). The outer race 83B may include a series of biased rollers or bearings 85, such as by a series of springs 87, that engage/disengage with the corresponding notches or other engagement portions 89 of the outer race 83B to stop or prevent rotation of the rollers 85. As such, when the inner race 83A is rotated in the drive direction D, such as by rotation of the motor 60, the rollers 85 are engaged thereby and urged into the notches 89 so as to prevent rotation of the rollers 85 and allow the inner race 83A to drive, and rotate the outer race 83B to drive the feed roller 18. When the outer race 83B is rotated separately, such as by manual dispensing of the sheet material, the rollers 85 can be held in place by the springs 87 so as to rotate or spin freely, allowing the outer race 83B to turn independently of the inner race 83A, and thus enable the feed roller 18 to rotate absent resistance caused by forced rotation of the motor 60.

Figure 5B:
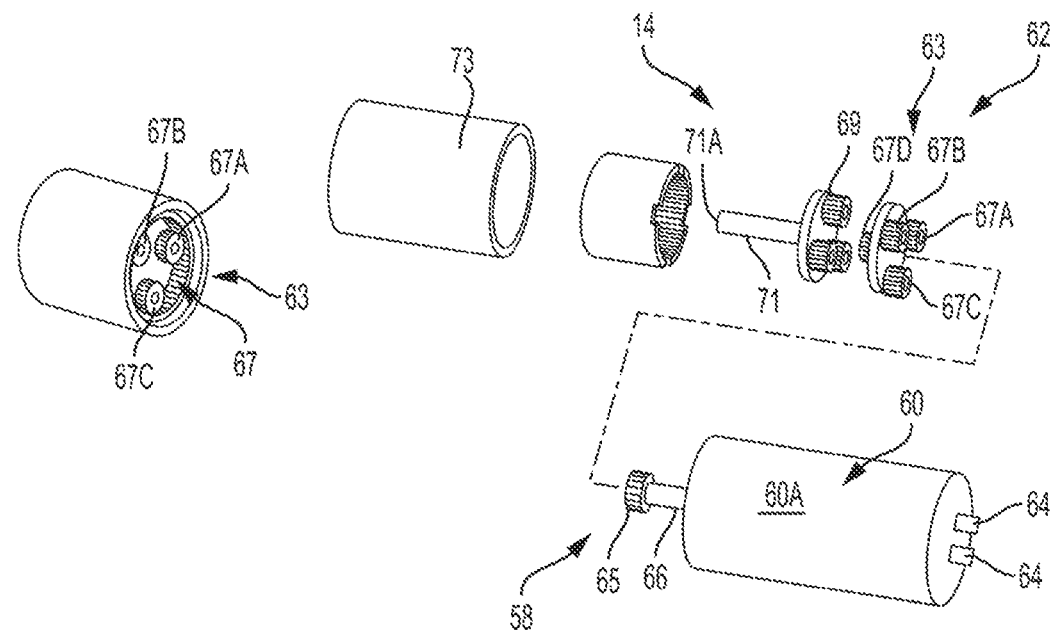
FIG. 5B is an exploded view of an example gear arrangement for the drive assembly of the feed roller drive assembly shown in FIG. 5A.

In additional embodiments, other gear or drive arrangements can be used. For example, as indicated in FIG. 5B, a planetary gear arrangement or a gear reduction assembly 63 can be provided, wherein the drive motor 60, which can include a brushless servo motor, a stepper motor or other, similar type of adjustable, variable speed motor sized, configured to fit within the open end of the feed roller body, with driveshaft 66, further can be coupled to or include a drive gear 65 mounted thereon. This drive gear in turn can engage a corresponding planetary or other drive gear assembly 67 of the planetary gear arrangement or gear reduction assembly 63. For example, the drive gear 65 of the driveshaft of the motor can engage a first planetary gear assembly 67, with the drive gear of the motor driveshaft being received between and engaged by a series of three-four planetary gears 67A-C which in turn can drive a forwardly extending gear 67D adapted to engage a second planetary gear assembly 69, the rotation of which in turn drives a fixed or stub shaft 71 as illustrated in FIG. 5B. The planetary gear arrangement or gear reduction assembly 63 also can be received within a gear reduction assembly housing 73 as a unit, with the stub shaft or planetary gear driveshaft 71 of the planetary gear arrangement or gear reduction assembly 63 being attached or mounted at its distal end 71A to a partition or otherwise engaging the inner side wall of the feed roller body. It also will be understood that fewer or more, or still other gear drive arrangements also can be provided as needed to adjust or reduce the driving force provided by the motor for driving the feed rollers.

The drive assembly 58 typically can be mounted substantially adjacent to the first or second end 28A/28B of the feed roller body 28, for example, in a substantially fixed position at one end, such as the first end 28A, of the feed roller body 28, with the drive assembly 58 being at least partially positioned, disposed or arranged within the interior cavity 32 so as to be integrated with the feed roller body 28. As schematically indicated in FIGS. 3 and 4A-B, the drive assembly 58 may include the motor housing 96 mated to the dispenser housing 16 for supporting or holding the motor 60 within the interior cavity 32 of the feed roller body 28. The motor housing 96 will generally include a body 98 with the base or flange portion 100 and a substantially cylindrical portion 102 extending or protruding from the base 100, which cylindrical portion 102 defines a cavity or chamber 104 extending therealong sized, configured and dimensioned for receiving or housing the motor 60. The motor 60 may be secured or fixed within the motor housing 96, such as by press fitting the motor 60 within the chamber 104, and there may further be one or more seals or other suitable elastic portions formed from a cushioning or dampening material and arranged or positioned between the housing 96 and the motor 60 sufficient to dampen or reduce vibrations caused by operation of the motor 60.

The flange portion 100 of the motor housing 96 also can have a series of holes or apertures 106 formed/defined therein so as to align with the holes 54 defined in the housing sidewall 38/39 and the apertures 52 of one of the bearings 40 so that the motor housing 96 can be fixed in place within the dispenser housing 16 by the fasteners 56, and further can extend into and be supported within the recess or cavity 32 of the roller body 18 providing an integrated driven roller assembly (FIG. 4A). The body 98 of the motor housing further may include a stepped portion 99 with a surface 99A, which stepped portion 99 may be configured, sized and dimensioned to be fitted and received within one or more protruding portions or ridges 57 of the bearings 40 such that an inner surface 57A of each of the ridges 57 can contact or engage a surface 99A of the motor housing, so as to facilitate construction of the dispenser by, for example, ensuring proper alignment of the motor housing with respect to the sidewalls 38/39 and the feed roller body 28 thereby increasing the tolerances or the allowable deviation of the dimensions of the motor housing and reducing potential errors during manufacturing.

As illustrated in FIGS. 5A and 6B-C, the motor 60 also can be rotatably mounted and supported within the body of the feed roller, such as by one or more spaced motor/roller bearing assemblies 265. As indicated in FIG. 5A, the motor bearing assemblies 265 can include a series of ball or roller bearings 266 contained between bands or sections 267, which bearings 266 can be fixed to or integrally formed with an outer surface 60A of the motor 60. As a result, as the feed roller 18 is rotated, the motor 60 can remain stationary with the feed roller body 30 being driven by operation of the motor 60 and rotating thereabout. Also, though two bearing assemblies are shown in the present embodiment, one bearing assembly or multiple bearing assemblies can be used without departing from the present disclosure.

With the motor 60 at least partially disposed within the roller body 28, the noise generated/heard from operation of the motor 60 can be substantially reduced. A relatively large diameter roller also may be employed/selected to provide a housing or cavity for containing a desired size motor 60 within the roller body 28, as needed. For example, the roller body 28 may have a diameter in the range of approximately 20 mm to approximately 40 mm, such as about 24 mm or about 36 mm, and increasing the diameter of the roller body 28 can generally allow for the use of a bigger motor, which may increase efficiency and/or the power supplied to the feed roller 18 so as to allow for dispensing of heavier sheet materials. It further should be understood that additional drive system or assemblies also can be provided, e.g., on both sides or ends of the feed roller, as needed, such as for feeding heavier sheet materials.

FIGS. 3 and 4A further show a guard or cover 108 that can be placed over the drive assembly 58 and bearings 40 to substantially seal off the components of the drive assembly 58 received within the roller body 28 and the bearings 40 attached to the dispenser housing 16 so as to prevent particulates or other particles from impacting performance of the motor 60, operation of the other components of the drive assembly 58, and/or rotation of the bearings 40 or feed roller 18. The cover 108 can include a body 110 with a cavity or chamber 112 defined therein and having an inner rear wall 114 and inner sidewalls 116. The chamber 112 can be sized, dimensioned and configured to cover the flange 100 of the motor housing body 98 and/or the flange 50 of the bearings 40. The cover 108 may be releasably or detachably connected or coupled to the flanges 50/100 to allow for replacement and/or maintenance of the various components of the dispenser 10. However, the cover 108 may be more permanently connected to the dispenser housing 16 and/or flanges 50/100, such as by an adhesive or other suitable means, so to, by way of example, prevent tampering with the components housed therein.

Figure 12:
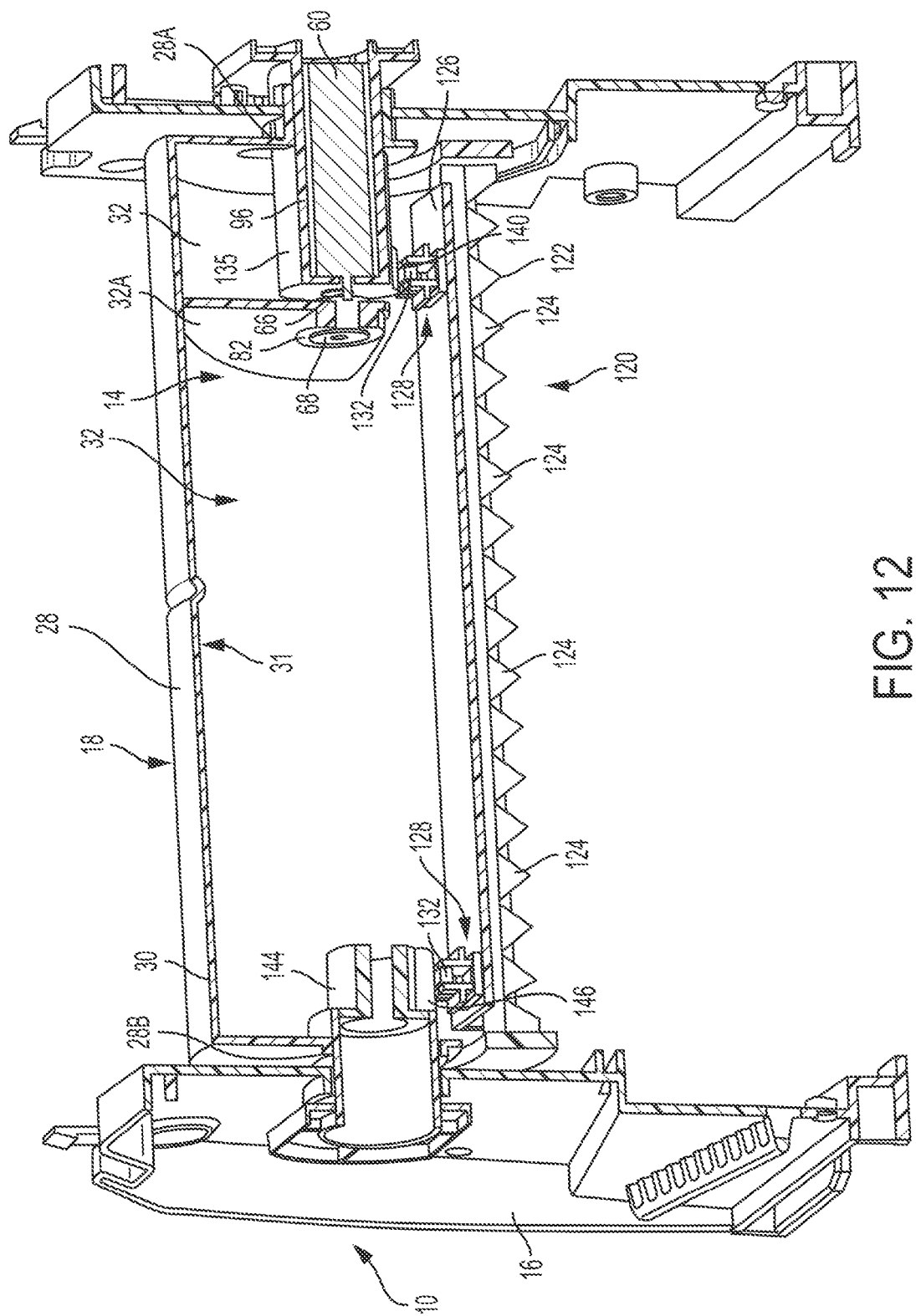
FIG. 12 shows a cross-sectional, partial cutaway view of a cutting mechanism for use with a dispenser according to principles of this disclosure.
Figure 14:
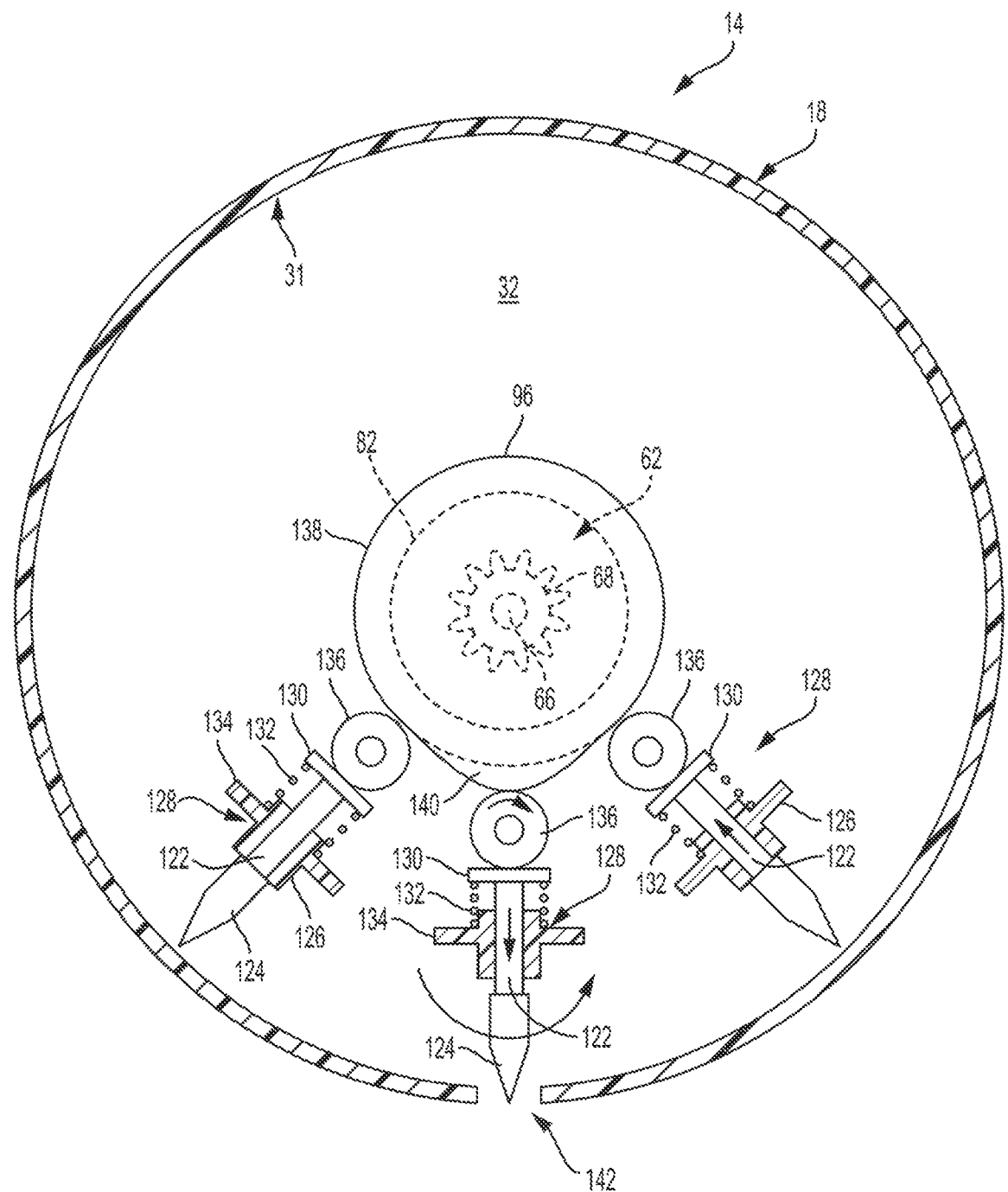
FIG. 14 provides a cross-sectional view of the cutting mechanism according to FIG. 12.

As indicated in FIGS. 11-12 and 14, the dispenser 10 additionally may include one or more cutting mechanisms 120 to allow for at least partially cutting, perforating, scoring, or otherwise creating a line of separation, along a selected portion of sheet material 12, e.g., after a desired or prescribed length or amount of material has been dispensed or fed along the dispensing path. As generally shown in FIGS. 12 and 14, one example cutting mechanism 120 can include an actuating or movable cutting blade 122 having a series of teeth 124 may be at least partially received within the feed roller body 28 and can be selectively movable to cut or make a series of perforations in the sheet material 12 to enable/facilitate tearing or removal thereof. The cutting blade 122 may be at least partially supported by a support portion or body 126 that can be substantially fixedly connected within the feed roller body 28 so that the cutting blade 122 is rotatable therewith.

As shown in FIG. 14, the cutting blade 122 may further be actuated between a series of positions, including a first position retracted within the feed roller and second or further additional positions moving/extending out of the roller body 28, under the control of one or more piston-like actuation mechanisms 128 at a selected point during rotation of the feed roller, and/or at a selected location along the feed path of the sheet material, to cut or perforate the sheet material after feeding/dispensing of a desired or prescribed amount or length of material has been fed. In some embodiments, each actuation mechanism 128 generally can include a movable body 130 supporting the cutting blade 122, an elastic body, such as a spring 132, that biases the cutting blade 122 toward its retracted position and is compressible between the movable body 130 and one or more flanges 134 of the support body 126 for controlling the movement of the movable body 130 and cutting blade 122 coupled thereto. The movable body 130 may further be operatively connected to a roller or cam follower (or followers) 136 that move about a guide surface 138 of the motor housing 96 and can engage with a cam surface 140 (FIGS. 13-14) arranged therealong so as to move the movable body 130 and the cutting blade to its extended cutting position.

For example, as further schematically shown in FIG. 14, as the feed roller 18 is driven by the motor, or is manually rotated, the rollers 136 roll along the guide surface 138 of the motor housing 96. As the roller 136 contacts or engages the cam surface 140, the springs 132 are compressed, thereby causing the cutting blade 122 to move to an extended positon with the cutting edge or teeth 124 of the cutting blade projecting out of opening 142 defined in the feed roller body 28 to an extent to at least partially cut or perforate the sheet material 12 sufficient to enable or facilitate its removal. The cam surface 140 may be positioned on or arranged along the body 98 of motor housing 96 (FIG. 13) so that the cutting blade 122 is in the extended position and thereby cuts, scores, or perforates the sheet material, for example at, adjacent, or substantially near a pinch point between the feed roller 18 and a pressing roller, though the sheet material 12 can be alternatively cut or perforated at any suitable position. As the rollers 136 move away from engagement with the cam surface 140 and again engage the guide surface 138, the cutting blade 122 may be returned to a retracted position. Further, there may be corresponding guide and cam surfaces 144/146 along a side of the feed roller 18 opposite the motor housing so as to enable/facilitate substantially consistent extension of the cutting blade 122 along the feed roller 18.

FIGS. 15A-15C, 16A-16E, and 17 show a dispenser cutting assembly or system 320 according to another aspect of the present disclosure. As shown in FIGS. 15A-15C, 16A-16E, and 17, the cutting assembly 320 can include a cutting blade 322 and a base or support 324 connected to and at least partially supporting the cutting blade 322. The base 324 can be pivotably or otherwise movably mounted within a cavity or chamber 326 defined within the feed roller body 328, such that teeth or sharpened portions 330 of the cutting blade 322 are extensible between extended and retracted positions out of and back through an opening or slot 332 defined along the feed roller body 328 by movement of the base.

The base 324 can have a body 332 with front 334, back 336, top 338, bottom 340, and side 342/344 portions or sections (FIG. 15B). In one embodiment, the body 332 of the base 324 further can be formed from a plastic material or other polymeric material, though other suitable materials, such as rubber, wood, composites, etc., also can be used without departing from the scope of the present disclosure. The base 324 further generally will be coupled or connected to the cutting blade 322 along the top portion 338 of the base 324, for example, by a series of fasteners 341, such as screws, bolts, rivets, etc., that can be received and/or threaded through a series of holes 343 defined in/through the cutting blade 322 as well as corresponding holes 345 defined in the top portion of the base 324. However, the cutting blade 322 can be otherwise fixed to or integrally formed with the support/base 324, without departing from the scope of the present disclosure.

As generally shown in FIGS. 16A-E, the base 324 further will be rotatably or pivotally coupled to at least a portion of the feed roller body 328. For example, the cutting assembly 320 can include pins 346, or other suitable connection means or connecting members, e.g., rods, bearings, etc., allowing for pivoting or rotation thereabout, to couple to ends 324A/B of the base 324 to side walls 348 of the feed roller body 328 such that the base/support 324 is rotatable/pivotable about the pins 346 and further moves/rotates with the feed roller body 328 during dispensing of the sheet material. Additionally, the cutting assembly 320 can include one or more biasing members 350, such as torsion springs, or other suitable biasing members, that are coupled to pins 346 and provide a biasing force against the support/base 324, e.g., sufficient to urge or bias the support/base 324, and thus the cutting blade 322, toward a retracted position.

Figure 15A:
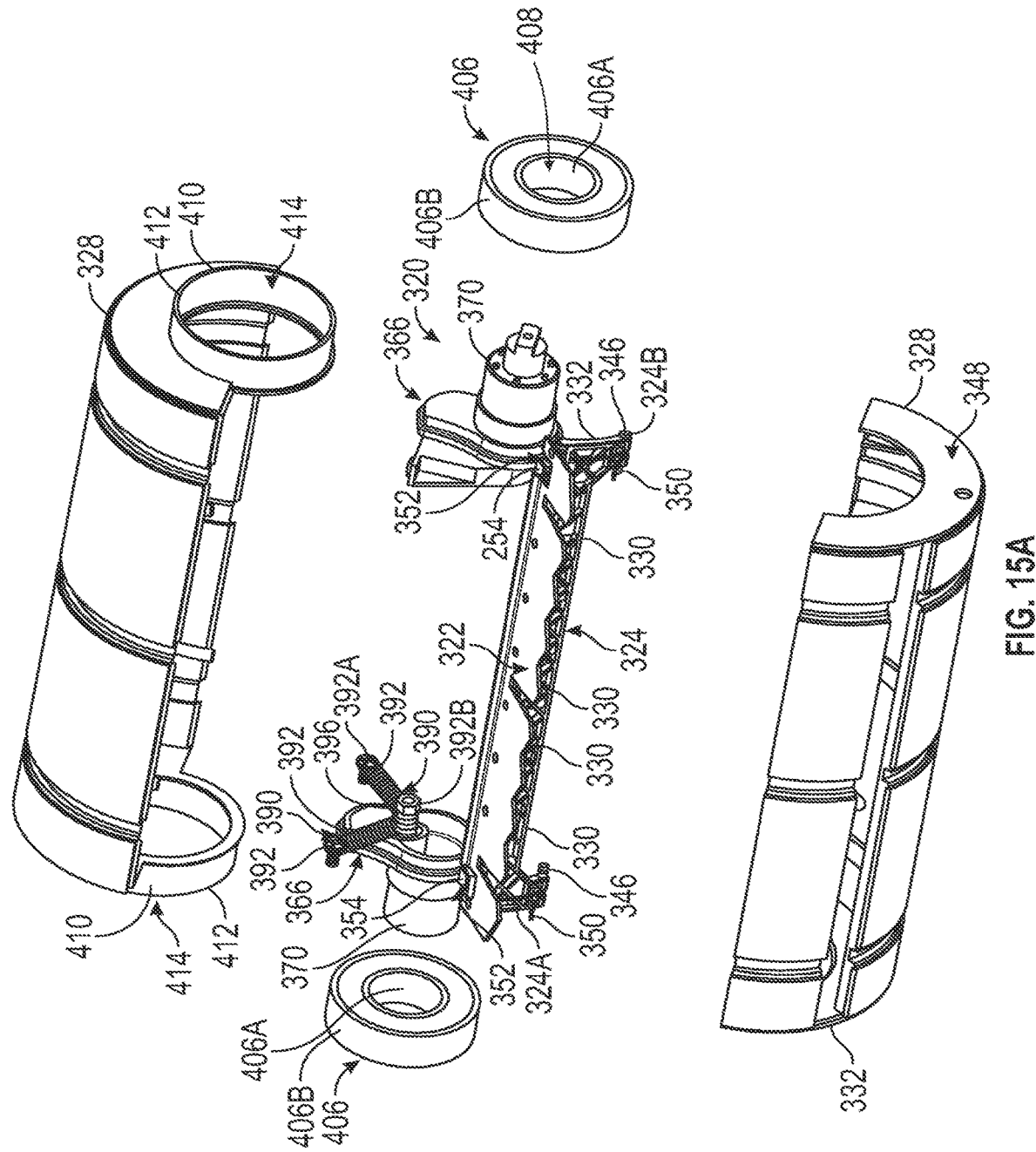

FIGS. 15A-15C and 16A-16E further show that the base 324 also will have a cam follower assembly 352 arranged along the top portion 338 thereof. The cam follower assembly 352 generally has one or more cam followers 354, which can include bearings, rollers, or other rotating members or portions. In one embodiment, the cam followers 354 can be at least partially received within notches or grooves 356 defined in the top portion 338 of the base 324, and can be rotatably coupled thereto by rods or pins 358, or other suitable connection mechanisms, as generally shown in FIG. 15B. The rods or pins 358 each further will be received/engaged within a hole or passage 360 defined through a body 362 of each cam followers 354 and corresponding holes/passages 364 defined along the top portion 338 of the base 224, to rotatably couple the cam followers 354 to the base 324 as shown in FIG. 15C.

The cam followers 354 engage and move along one or more corresponding cam surfaces or tracks 366 located within the cavity 326 of the feed roller body 328, as the feed roller body 328 is rotated, and correspondingly pivot/rotate the base 324 and move the cutting blade 322 out from and back into the opening/slot 332. For example, in one embodiment, the cutting assembly 320 can include cam members 370 that can be mounted in a substantially fixed or stationary position within the cavity 326 of the feed roller body 328, such that the feed roller body 328 and the base 324 are rotated about such cam members 370, such as indicated in FIGS. 16A-E.

The biasing member 350 further generally can bias or urge the cam followers 354 against and into engagement with at least a portion of the cam members 370. The cam members 370 further can have one or more protrusions, protuberances, or extending portions 372 provided thereaIong, such that when the protrusion(s) 372 are engaged by the cam followers 354 the biasing force of the biasing member 350 is overcome to cause the base/support 324 to pivot, rotate, or otherwise move and thereby extend the cutting blade 322 out from the opening/slot 332 in the feed roller body 328 for at least partial perforation or cutting of the sheet material. Accordingly, as shown in FIGS. 16A-E, as the feed roller body 328 is rotated to dispense sheet material 12 (and the base 324 is rotated therewith) the cam followers 354 will be pressed against/into engagement with and moved along the cam members 370 such that the support/base 324 pivots or moves the cutting blade 322 between a plurality of extended and retracted positions 374, 380, 382.

Figure 16A:
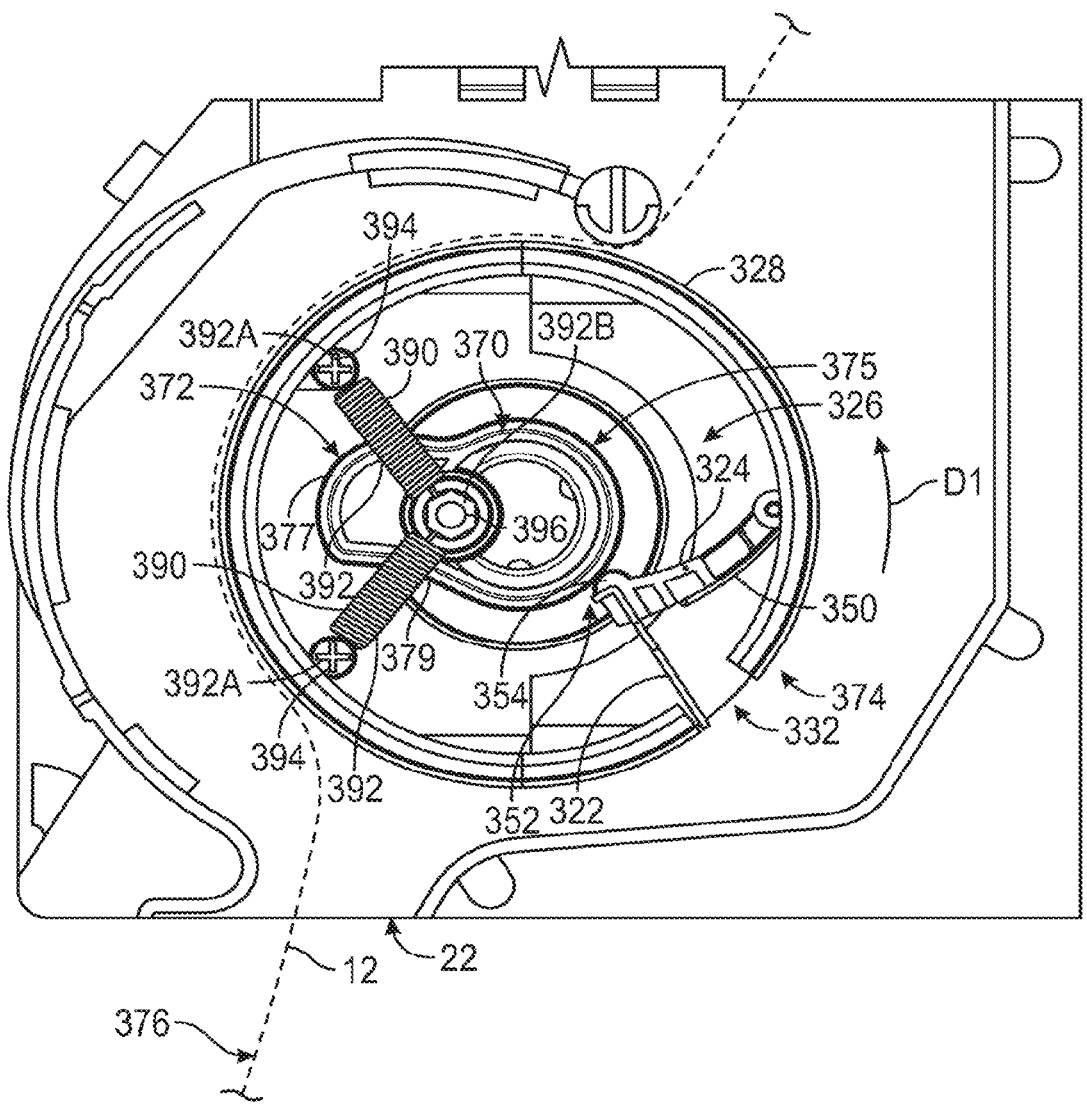
FIGS. 16A-16E show cross-sectional views of a feed roller with the cutting system/assembly of FIGS. 15A-15C.

As shown in FIG. 16A, the cutting blade 322 initially can be in a rest or initial position 374, with the cam followers 354 engaging a surface or portion 375 of the cam members 370 such that the cutting blade 322 is retracted from the opening 332 in the feed roller body 328. In this rest/initial position 374, a tail or portion 376 of the sheet material 12 may hang or otherwise extend from the discharge chute 22 of the dispenser. It will, however, be understood that the present disclosure is not limited to this arrangement, and the sheet material 12 may be concealed within the dispenser or in any other suitable arrangement, without departing from the scope of the present disclosure.

Figure 16B:
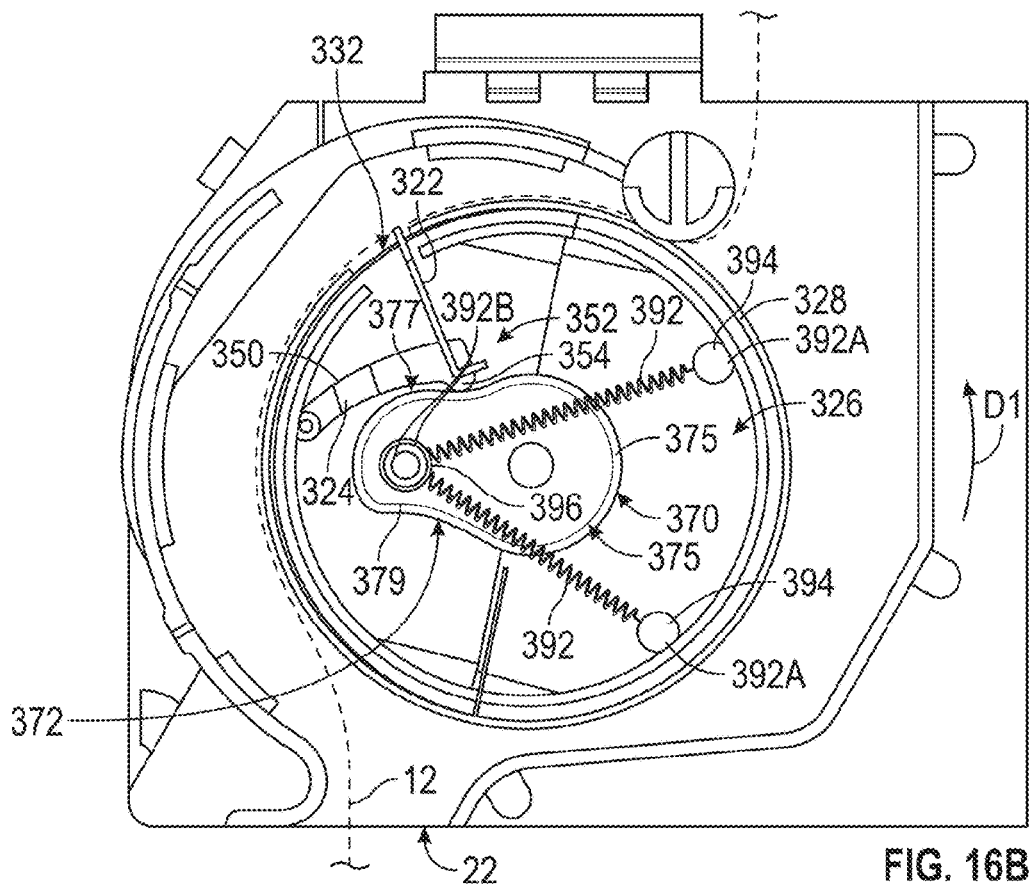
Figure 16C:
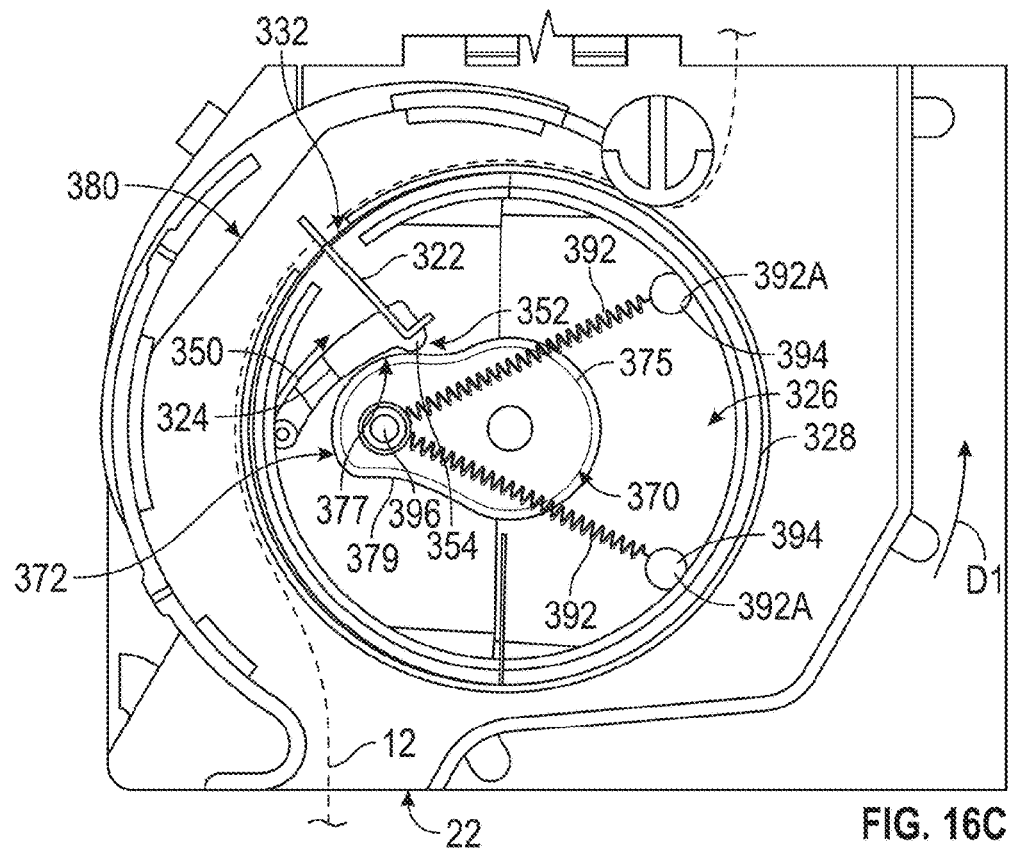

As further shown in FIGS. 16B-C, when the feed roller body 328 is rotated to dispense a selected amount of sheet material, for example, upon activation of the motor or by a manual activation of the dispenser, e.g., when a user turns a knob or lever 300 operatively connected to the feed roller body 328 by a post or support 302 (FIGS. 17 and 18) or pulls on the tail 276 extending from the discharge, the cam follower 354 will move along surface 375 until the cam follower 354 engages a cam surface or portion 377 of a protrusion 372 of the cam member 370 and is moved to an extent sufficient to overcome the biasing force of the biasing member 350. In response, the support/base 324 will be pivoted so as to move the cutting blade 322 to exit the opening 332 defined in the feed roller body 328 to cut, score, or perforate the sheet material 12.

FIG. 16B additionally shows that when the feed roller body 328 is rotated an initial amount, e.g., rotated approximately 150° to approximately 180°, such as approximately 170°, from the rest position 374 in a counterclockwise direction D1, the cam follower 354 generally will begin to engage the surface or portion 377 of the protrusion 372 and the cutting blade 322 will begin to exit the opening 332.

Thereafter, as shown in FIG. 16C, as the feed roller body 328 is rotated a further amount, e.g., rotated approximately 170° to approximately 200°, such as approximately 180°, from the rest position 374 in the counterclockwise direction D1, to the cam follower 354 is moved further along the surface/portion 377, causing the cutting blade 322 to extend further toward a cutting position 380 with the cutting blade 322 contacting or otherwise engaging the sheet material for cutting or perforation thereof. In one embodiment, the cam surface or portion 377 of the protrusion 372 further generally can be sloped, curved, or otherwise shaped or configured to help control the engagement of the cutting blade with the sheet material so as to substantially prevent ripping or tearing during cutting, scoring, or perforation thereof.

Figure 16D:
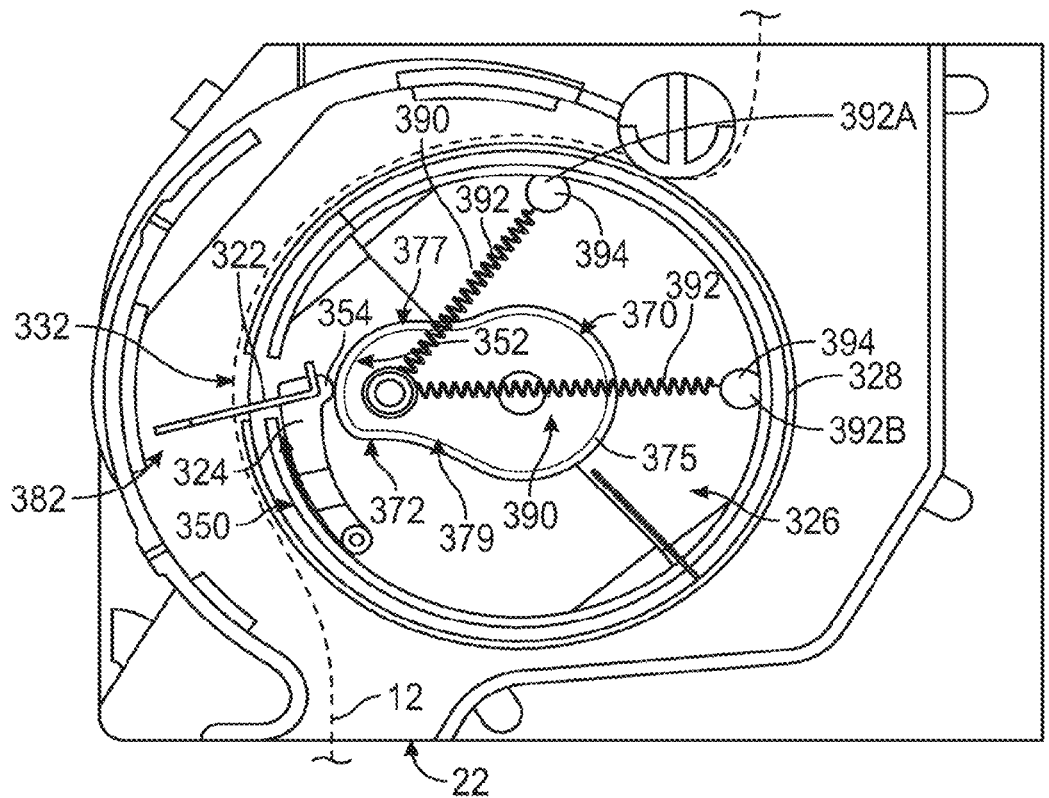

Subsequently, as illustrated in FIG. 16D, when the feed roller body 328 rotates an even further amount, e.g., approximately 220° to approximately 240° or more, such as approximately 230°, from the rest position 374 in the counterclockwise direction D1, the cam follower 354 is moved further along the cam surface or portion 377 such that the cutting blade 322 is moved to its fully extended position 382, with the cutting blade 322 substantially projecting or extending out of the opening 332 in the feed roller body 328.

Figure 16E:
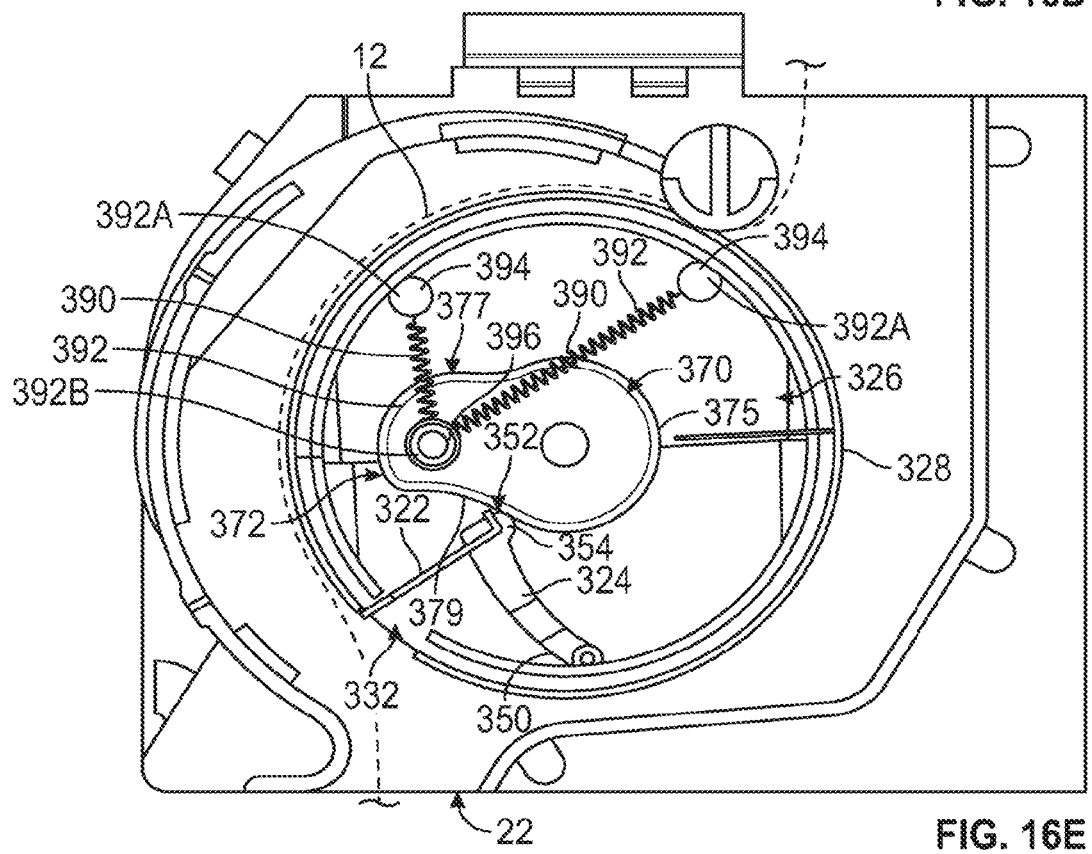

Thereafter, as the feed roller body 328 continues to rotate, as shown in FIG. 16E, as the cam follower 354 engages and moves along cam surface or portion 379 of the of the protrusion 372, the cutting blade 322 will be retracted back through the opening 332 in the feed roller body. Additionally, when the feed roller body 328 has made a full rotation, e.g., rotated approximately 360° from its initial or rest position 374, the cam follower will again engage the cam surface or portion 375 of the cam members 370 such that the cutting blade 322 is in its retracted or initial position (FIG. 16A)

FIGS. 15A and 16A-E further show that the feed roller body 228, in some embodiments, can include biasing members 390 disposed within the body and operable or configured to assist rotation of the feed roller body 328 and movement of the cutting assembly 320, for example, upon manual activation of the feed roller body 328. The biasing members 390 can include tension springs 392, e.g., one or two tension springs, though any suitable number of springs, such as 3 or more, also can be employed without departing from the scope of the present disclosure. The springs 392 generally will be fixably connected to the feed roller body 328 and rotatably coupled to at least a portion of one of the cam members 370, or other suitable fixed portion positioned within the cavity 326 of the feed roller body 328. For example, one end 392A of the springs 392 can be fixably connected, such as by fasteners 394, e.g., screws, bolts, rivets, etc., to the feed roller body 328, and an opposite/opposing end 392B of the springs 392 can be rotatably connected, such as by a bearing assembly 396, or other moveable/pivotably assembly, to one of the cam members 370. The springs 392 also can be arranged such that they are transverse or oblique to one another, for example, the springs 392 can be disposed to have an angle of approximately 30°-45° therebetween, though lessor angles and/or angles up to 90° or more can be used without departing from the scope of the present disclosure.

As shown in FIG. 16A, with the cutting blade 322 at its initial or rest position 374, the springs 392 can have an initial or equilibrium length. Then, as the feed roller body 328 is rotated, the springs 392 will be elongated and can provide biased assistance for rotation of the feed roller body 328, with the spring tension further assisting movement of the cutting blade 322 for cutting, scoring, or perforating the sheet material. The springs 392 further can cause the feed roller body 328 to fully rotate, e.g., rotate approximately 360°, while also helping to return the cutting blade 322 to its initial or rest position 374, retracted into the body of the feed roller.

Figure 17:
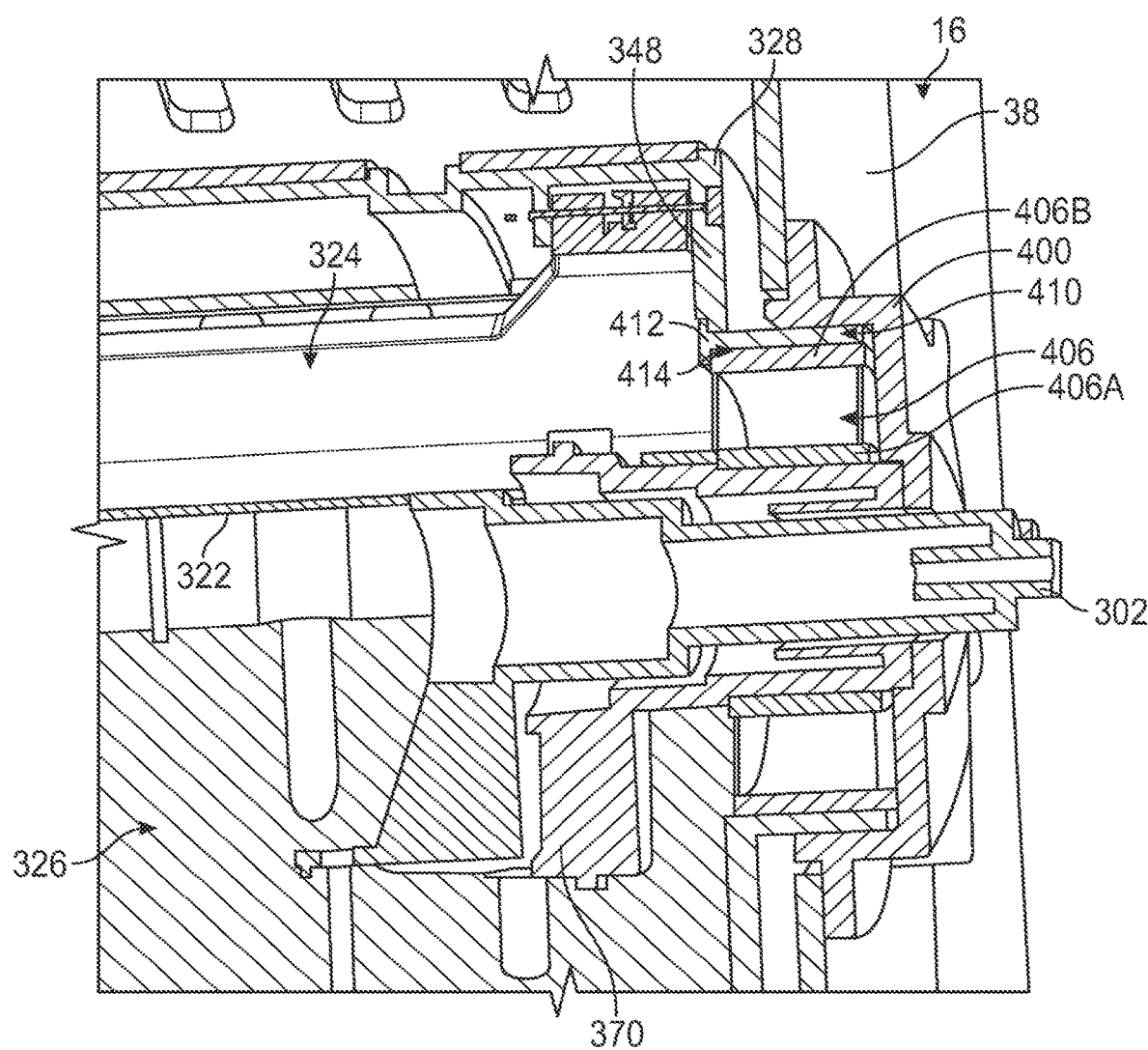
FIG. 17 shows a further cross-sectional view of a feed roller with the cutting system/assembly of FIGS. 15A-15C.
Figure 18:
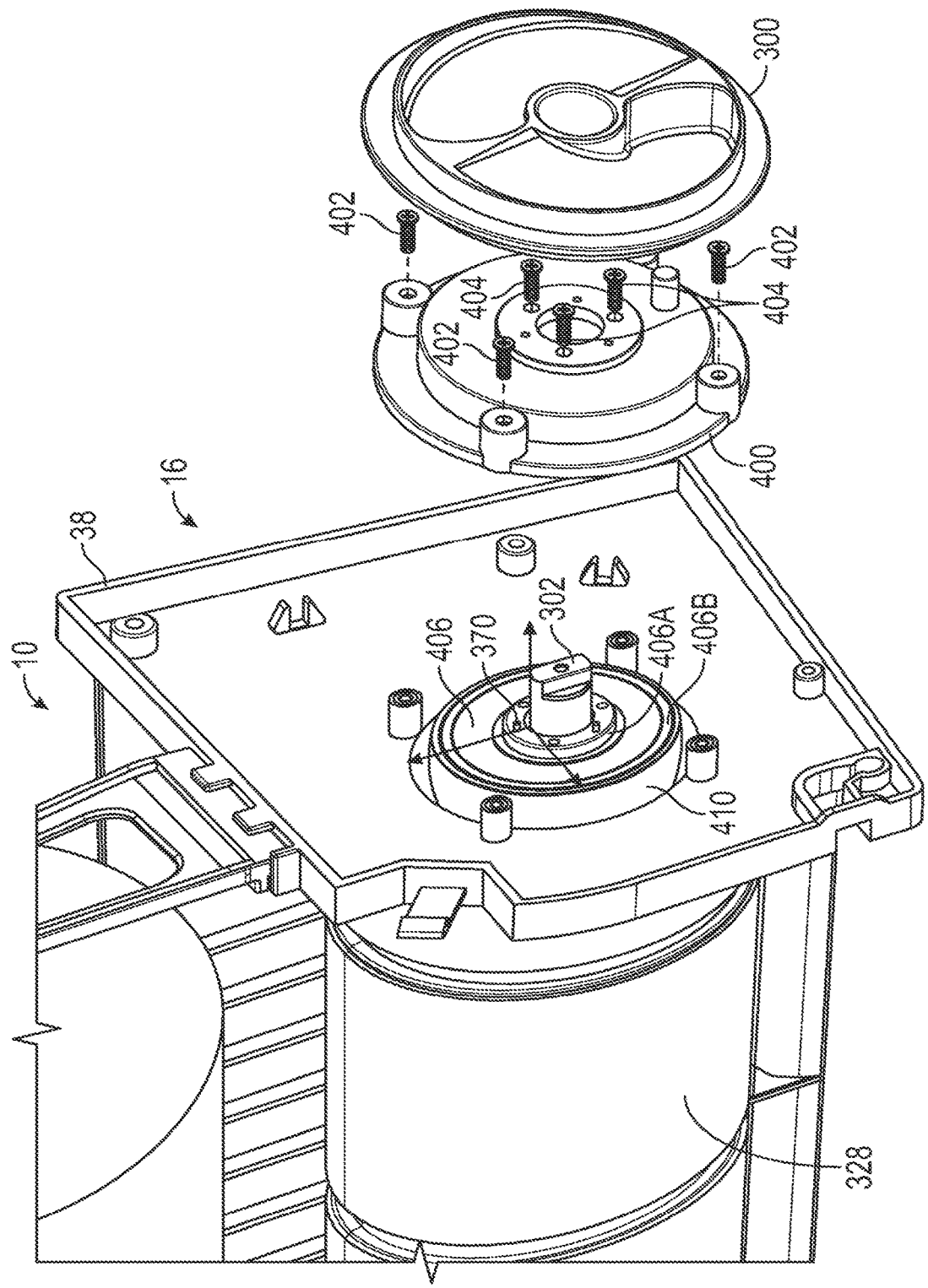
FIG. 18 shows a partial perspective view of a manually driven dispenser according to principles of the present disclosure.

FIGS. 17 and 18 further show the cam members 370 attached to at least a portion, e.g., side walls 38/39, of the dispenser housing 16, for example, by support caps 400. The support caps 400 can be connected to the side walls 38/39 of the dispenser housing by a series of fasteners 402, e.g., screws, bolts, rivets, etc., and further can be connected to the cam members 370 using fasteners 404, such as screws, bolts, rivets, etc., to mount and support the cam members 370 within the cavity 326 of the feed roller body 328. As a result, the feed roller body 328 and the base 324, with the cutting blade 322 attached thereto, are supported in a manner so as to be generally rotatable about the cam member 370. Other connectors also can be used to connect the support caps 400 to the dispenser housing 16 and the cam members 370, however, such as, for example, snap-fit or press-fit connections, adhesives, etc., without departing from the scope of the present disclosure.

As further shown in FIGS. 15A, 17, and 18, the feed roller body 328 can be rotatably coupled to the cam member(s) 370 by bearings 406. For example, at least a portion of the cam members 370 will be received within a passage 408 defined through the bearings 406, and can engage an inner race 406A of the bearings 406. The bearings 406 further will be connected to the feed roller body 328 by one or more support portions 410, each of which can include a body 412 having a ring-like or circular shape and connected to or integrally formed with the sidewalls 348 of the feed roller body 328, as generally indicated in FIGS. 15A and 17. The bearings 406 further generally can be received within, e.g., fitted into, a passage 414 defined through the body 412 of each of the supports 410 to operatively connect the feed roller body 328 to an outer race 406B of the bearings 406.

Figure 19A:
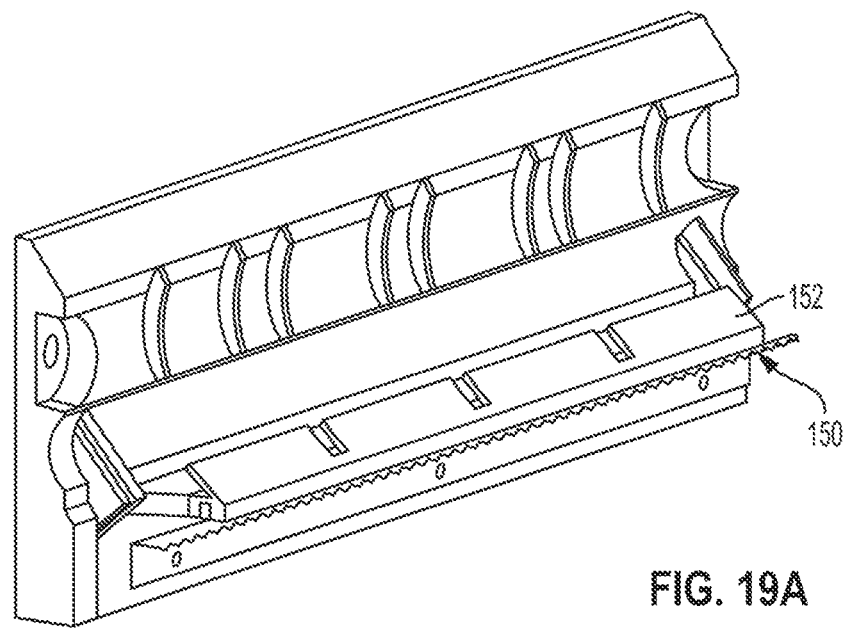
FIGS. 19A-19B provide examples of a tear bar and pivotable pawl member according to principles of this disclosure.
Figure 19B:
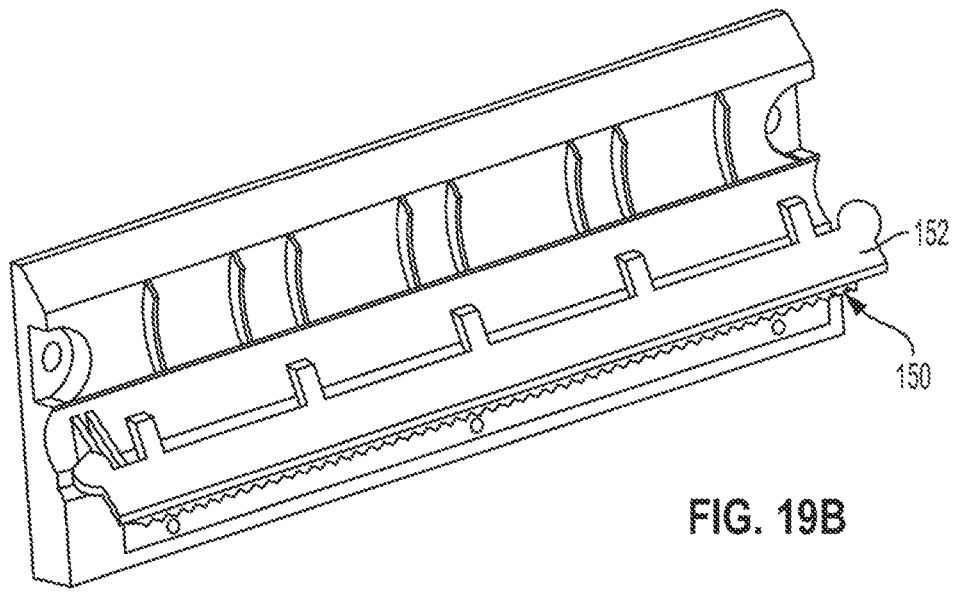

Additionally, or alternatively, the dispenser housing 16 may include one or more tear bars or other suitable cutting members 150 disposed adjacent or along the discharge throat or chute of the dispenser housing so that a user can separate a sheet or measured amount of the material by grasping and pulling the sheet across the tear bar 150 (FIGS. 2C and 19A-19B). In addition, a pivotally mounted pawl member 152 can be located proximate to the stationary tear bar 150 such that movement of sheet material 12 into the tear bar 150 for severance pivots the pawl member 152 between multiple positions, e.g. a first 152 A and second 152 B positions. A signal device such as a proximity sensor switch or the like, cooperative with the pawl member 152, can also be arranged such that movement of the pawl member 152 between various positions causes the signal means to send a signal to notify the control circuit that the sheet material has been removed. By way of example, as shown in FIG. 2C, such signal means responsive or cooperative with the pawl member 152 can include an infrared emitter 151 and detector 153 that detects movement of the pawl member 152 between the first and second positions 152A/B, though any suitable sensor can be employed such as a proximity sensor or other detector, a magnetic switch, or a mechanical switch. After receiving a signal that sheet material 12 may have been removed, the control circuit can activate a paper detection sensor to verify that the sheet material has been removed from the discharge chute.

Figure 20:
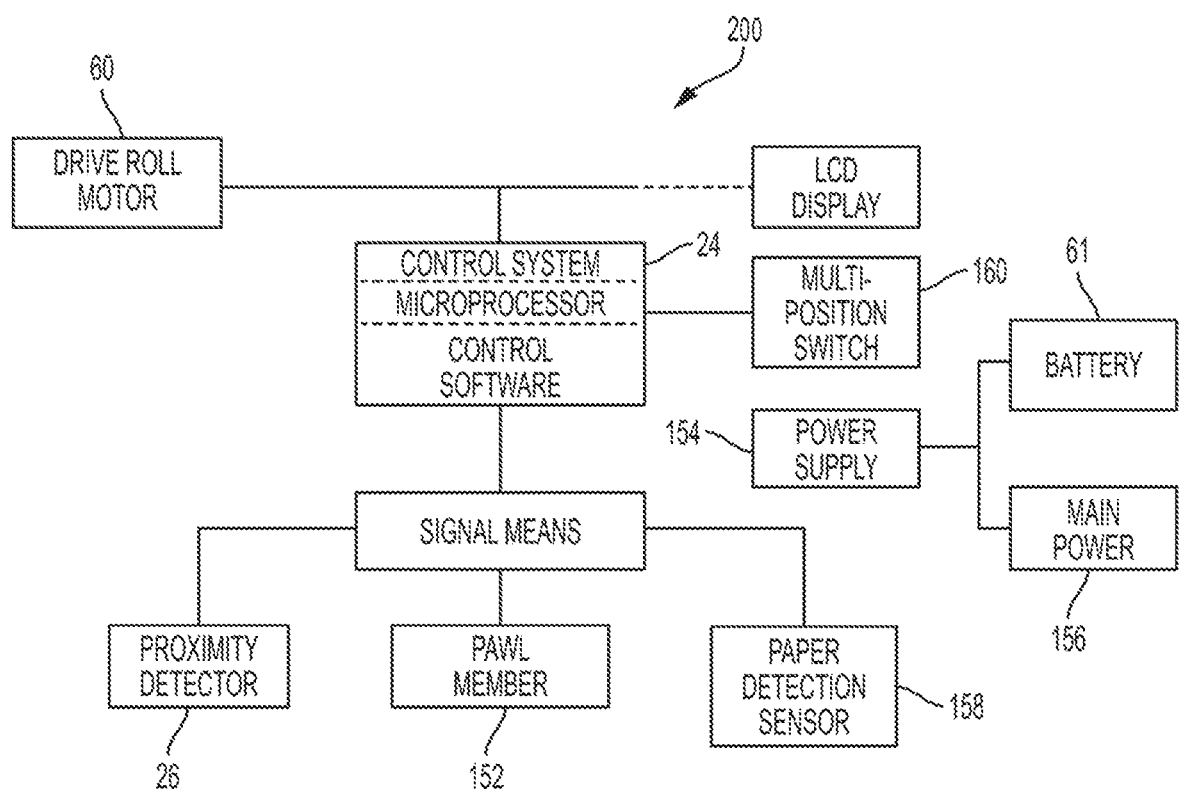
FIG. 20 shows a block diagram of an example of a control system in communication with the dispenser according to principles of the present disclosure.

FIG. 20 illustrates a block diagram of the electronic control system or circuit 200 for operating the dispenser 10 in an exemplary embodiment. The dispenser or operative components of the dispenser may be powered by a power supply 154 such as one or more batteries 61 contained in a battery compartment, though any suitable battery storage device may be used for this purpose. Alternatively, or in addition to battery power, the dispenser may also be powered by a building's alternating current (AC) distribution system as indicated at 156. For this purpose, a plug-in modular transformer/adapter could be provided with the dispenser, which connects to a terminal or power jack port located, for example, in the bottom edge of the circuit housing for delivering power to the control circuitry and associated components. The control circuit also may include a mechanical or electrical switch that can isolate the battery circuit upon connecting the AC adapter in order to protect and preserve the batteries.

In one example embodiment of an electronic dispenser, the sensor 26, such as a proximity detector or other sensor, may be configured to detect an object placed in a detection zone external to the dispenser to initiate operation of the dispenser. This sensor may be a passive sensor that detects changes in ambient conditions, such as ambient light, capacitance changes caused by an object in a detection zone, and so forth. In an alternate embodiment, the sensor 26 may be an active device and include an active transmitter and associated receiver, such as one or more infrared (IR) transmitters and an IR receiver. The transmitter transmits an active signal in a transmission cone corresponding to the detection zone, and the receiver detects a threshold amount of the active signal reflected from an object placed into the detection zone. The control system circuitry generally will be configured to be responsive to the sensor for initiating a dispense cycle upon a valid detection signal from the receiver. For example, the proximity sensor 26 or other detector can be used to detect both the presence of a user's hand below. The dispenser can additionally include a paper detector sensor 158, such as one or more infrared emitters and infrared detectors with one infrared emitter/detector pair aligned to detect a user's hand below the dispenser 10 and the second infrared emitter/detector pair aligned to detect a sheet hanging below the outermost front edge of the discharge chute 22.

The dispenser control system or circuitry 24 can control activation of the dispensing mechanism upon valid detection of a user's hand for dispensing a measured length of the sheet material 12. In one embodiment, the control system 24 can track the running time of the drive motor 60 of the motorized feed roller, and/or receive feedback information directly therefrom indicative of a number of revolutions of the feed roller and correspondingly, an amount of the sheet material feed thereby. In addition, or as a further alternative, sensors and associated circuitry may be provided for this purpose. Various types of sensors can include IR, radio frequency (RF), capacitive or other suitable sensors, and any one or a combination of such sensing systems can be used. The control system 24 also can control the length of sheet material dispensed. Any number of optical or mechanical devices may be used in this regard, such as, for example, an optical encoder may be used to count the revolutions of the drive or feed roller, with this count being used by the control circuitry to meter the desired length of the sheet material to be dispensed.

As shown in FIG. 20, the processing logic for operation of the electronic dispenser in, for example, the hand sensor and butler modes, can be part of the control software stored in the memory of the microprocessor in the control system 24. One or more binary flags are also stored in memory and represent an operational state of the dispenser (e.g., "paper cut" set or cleared). An operational mode switch in the dispenser sets the mode of operation. In the hand sensor mode, the proximity (hand) sensor 26 detects the presence of a user's hand below the dispenser and in response, the motor 60 is operated to dispense a measured amount of sheet material 12. The control system 24 can then monitor when the sheet of material is removed. For example, actuation of the pawl member 152 or triggering/activation of a paper detection sensor 158 can determine the removal of paper and reset the hand sensor. The hand sensor 26 also can be controlled to not allow additional sheet material to be dispensed until the hand sensor is reset. If the hand sensor 26 detects the presence of a user's hand but does not dispense sheet material, the control system 24 can check for sheet material using the paper detection sensor 158. If sheet material 12 has not been dispensed (i.e., no sheet material is hanging from the dispenser), the motor 60 will be activated to dispense a next sheet.

A multi-position switch 160 also can be provided to switch the dispenser operation between a first or standard operation mode and a second mode, such as a butler mode. In such butler mode, the hand sensor 26 for detecting the presence of a user's hand can be deactivated, and the control system 24 can automatically dispense sheet material when the cover is closed and the dispenser is put into operation. The paper detection sensor 158 further can determine if a sheet is hanging from the dispenser. If sheet material is hanging, the control circuit will then monitor when the sheet of material is removed. For example, a cutting mechanism movement detector, which may be arranged and configured to detect actuation or movement of the cutting mechanism 120; the pawl member 152; and/or the paper detection sensor 158 can determine the removal of paper and reset the dispenser. The next sheet will be dispensed automatically. If the paper detection sensor 158 determines the absence of hanging sheet material, the motor 60 will be activated to dispense the next sheet. The control circuit will then determine if the sheet has been removed before dispensing another sheet.

In one embodiment, the dispenser 10 can be operative in a first mode to be responsive to a signal from the proximity sensor to dispense a sheet of material. The dispensing mechanism is operative in a second mode to dispense a next sheet in response to the signal means being activated by movement of the cutting mechanism or tear bar to its extended position in response to dispensed sheet material 12 being removed from the dispenser. In another embodiment, the dispenser 10 can be operative in a second mode to dispense a next sheet in response to a signal means being activated by movement of the cutting mechanism 120, and a signal from a paper detection sensor 158 that the sheet material 10 has been removed from the dispenser. Such a sensor can be affixed to an external surface of the discharge chute 22 rather than inside the discharge chute 22.

The dispenser 10 generally can dispense a measured length of the sheet material, which may be accomplished by various means, such as a timing circuit that stops the drive feed rollers after a predetermined time. In one embodiment, the drive motor of the drive or feed roll can provide direct feedback as to the number of revolutions of the feed roller, indicative of an amount of the sheet material fed thereby. Alternatively, a motor revolution counter can be provided that measures the degree of rotation of the drive rollers and is interfaced with control circuitry to stop a drive roller motor after a defined number of revolutions of the feed rollers. This counter may be an optical encoder type of device, or a mechanical device. The control system 24 may include a device to allow maintenance personnel to adjust the sheet length by increasing or decreasing the revolution counter set point. The multi-position switch 160 can also be in operable communication with the control system 24 to select one of a plurality of time periods as a delay between delivery of a first sheet and delivery of a next sheet to the user.

The foregoing description generally illustrates and describes various embodiments of the present invention. It will, however, be understood by those skilled in the art that various changes and modifications can be made to the above-discussed construction of the present invention without departing from the spirit and scope of the invention as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present invention. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

What is claimed is:

1. A dispenser for dispensing sheet material, comprising:
   a supply of the sheet material;
   a feed roller rotatably arranged relative to the supply, the feed roller having a feed roller body with an exterior surface, wherein the sheet material is engaged against the exterior surface of the feed roller body for feeding the sheet material along at least a portion of a discharge path, and a cavity being defined within the feed roller body;
   a cutting assembly at least partially disposed within the cavity of the feed roller body, the cutting assembly including:
      a cutting blade configured to at least partially cut, score, or perforate the sheet material during dispensing of the sheet material; and
      at least one support connected to the cutting blade and the feed roller body, the at least one support being configured to actuate with rotation of the feed roller to move the cutting blade through at least one opening defined in the feed roller body as the feed roller rotates; and
   at least one pair of biasing members disposed within the cavity of the feed roller body, each biasing member of the at least one pair of biasing members including one end mounted to the feed roller body so that the one end of each biasing member of the at least one pair of biasing members rotates with the feed roller body, and each biasing member of the one or more biasing members further including an opposite end connected to a cam member, wherein the feed roller body is rotatable about the cam member; and
   wherein the biasing members of the at least one pair of biasing members are configured to provide a biased assistance to assist rotation of the feed roller.

2. The dispenser of claim 1, further comprising one or more pressing rollers positioned adjacent the feed roller body, the one or more pressing rollers biased toward engagement with the feed roller body so as to define a nip at which the sheet material is engaged and drawn between the one or more pressing rollers and the exterior surface of the feed roller body upon rotation of the feed roller.

3. The dispenser of claim 1, further comprising a cam follower coupled to the at least one support, wherein the cam member includes a cam surface configured to be engaged by the cam follower during rotation of the feed roller body to pivot the at least one support and move the cutting blade.

4. The dispenser of claim 3, further comprising at least one spring coupled to the at least one support and applying a biasing force to urge the cam follower into engagement with the cam surface of the cam member.

5. The dispenser of claim 1, further comprising a dispenser housing, wherein the cam member is fixedly mounted along the dispenser housing.

6. The dispenser of claim 1, further comprising a motor coupled to the feed roller for transferring torque from a driveshaft of the motor to the feed roller for driving the dispensing of the sheet material.

7. The dispenser of claim 1, further comprising a knob or lever operatively coupled to the feed roller body such that when the knob or lever is engaged by a user the feed roller is rotated to dispense an amount of the sheet material.

8. A dispenser, comprising:
   a feed roller having a feed roller body, the feed roller body configured for feeding a sheet material along at least a portion of a discharge path, and a cavity being defined within the feed roller body, wherein the feed roller body is rotatably mounted on a bearing;
   a cutting assembly at least partially disposed within the cavity of the feed roller body, the cutting assembly including at least a cutting blade and a support connected to the cutting blade, wherein the support is pivotably coupled to the feed roller body such that the support is pivoted to move the cutting blade through at least one opening defined in the feed roller body as the feed roller rotates; and
   one or more biasing members disposed within the feed roller body, each biasing member of the one or more biasing members including one end fixedly connected to the feed roller body, and each biasing member of the one or more biasing members further including an opposite end rotatably connected to a cam member, the cam member mounted at least partially within the cavity of the feed roller body and rotatably coupled to the feed roller body such that the feed roller is rotatable about the cam member, the cam member including a cam surface;
   a cam follower coupled to the support, wherein the cam follower is configured to engage and move along the cam surface of the cam member during rotation of the feed roller body to cause the support to move the cutting blade through the at least one opening; and
   wherein the one or more biasing members are configured to apply a biasing force to the feed roller such that the one or more biasing members urge the feed roller body to rotate toward a rest position and assist in returning the cutting blade to a position at least partially retracted into the cavity of the feed roller body.

9. The dispenser of claim 8, further comprising a knob or lever operatively coupled to the feed roller body such that when the knob or lever is engaged by a user the feed roller is rotated to dispense an amount of the sheet material.

10. The dispenser of claim 8, further comprising a motor coupled to the feed roller for transferring torque from a driveshaft of the motor to the feed roller for driving dispensing of the sheet material.

11. The dispenser of claim 8, further comprising one or more pressing rollers positioned adjacent the feed roller body, the one or more pressing rollers biased toward engagement with the feed roller body so as to define a nip configured to engage the sheet material between the one or more pressing rollers and an exterior surface of the feed roller body.

12. The dispenser of claim 8, wherein the one or more biasing members comprise tension springs.

13. The dispenser of claim 8, wherein the one or more biasing members comprise at least one pair of biasing members positioned adjacent a first end or a second end of the feed roller body.

14. A dispenser, comprising:
- a dispenser housing;
- at least one supply of sheet material;
- a feed roller having a feed roller body, the feed roller body having an exterior surface and at least one opening defined through the feed roller body, wherein the feed roller is configured to feed at least a portion of the sheet material along a discharge path defined through the dispenser housing;
- a cutting assembly at least partially received within the feed roller body, the cutting assembly including:
  - a cutting blade configured to at least partially cut, score, or perforate the sheet material;
  - a support having one end fixedly connected to the cutting blade and having another end pivotally connected to the feed roller body along an inner wall of the feed roller body, the support including a cam follower and being adapted to pivot with respect to the feed roller body during rotation of the feed roller body to move the cutting blade through the at least one opening toward and away from engagement with the sheet material;
  - at least one cam member including at least one protrusion, protuberance, or extending portion configured to be engaged by the cam follower during rotation of the feed roller body to move the cutting blade into and out of the at least one opening; and
  - at least two biasing members, each biasing member of the at least two biasing members having one end fixed to the inner wall of the feed roller body and an opposite end pivotally connected to the at least one cam member; and
- wherein the at least two biasing members are configured to assist rotation of the feed roller body and movement of the cutting blade through the one or more openings.

15. The dispenser of claim 14, further comprising at least one spring coupled to the support and configured to apply a biasing force to the support so as to urge the cam follower into engagement with the at least one protrusion, protuberance, or extending portion of the at least one cam member.

16. The dispenser of claim 14, further comprising a motor coupled to the feed roller for transferring torque from a driveshaft of the motor to the feed roller for driving dispensing of the sheet material.

17. The dispenser of claim 14, wherein the cam member is fixedly mounted along the dispenser housing.

18. The dispenser of claim 14, wherein the at least two biasing members comprise springs.

* * * * *